US009811759B2

United States Patent
Matsubara et al.

(10) Patent No.: US 9,811,759 B2
(45) Date of Patent: Nov. 7, 2017

(54) NC PROGRAM SEARCHING METHOD, NC PROGRAM SEARCHING UNIT, NC PROGRAM CREATING METHOD, AND NC PROGRAM CREATING UNIT

(71) Applicants: Susumu Matsubara, Tokyo (JP); Kenji Iriguchi, Tokyo (JP); Nobuyuki Takahashi, Tokyo (JP)

(72) Inventors: Susumu Matsubara, Tokyo (JP); Kenji Iriguchi, Tokyo (JP); Nobuyuki Takahashi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1062 days.

(21) Appl. No.: 14/004,356

(22) PCT Filed: Dec. 10, 2012

(86) PCT No.: PCT/JP2012/081978
§ 371 (c)(1),
(2) Date: Sep. 10, 2013

(87) PCT Pub. No.: WO2014/091543
PCT Pub. Date: Jun. 19, 2014

(65) Prior Publication Data
US 2014/0163711 A1 Jun. 12, 2014

(51) Int. Cl.
*G06K 9/62* (2006.01)
*G06K 9/00* (2006.01)
(Continued)

(52) U.S. Cl.
CPC ..... *G06K 9/6202* (2013.01); *G05B 19/40937* (2013.01); *G06F 17/30259* (2013.01);
(Continued)

(58) Field of Classification Search
USPC .................................................. 700/103, 161
See application file for complete search history.

(56) References Cited

U.S. PATENT DOCUMENTS 4,530,046 A * 7/1985 Munekata ........ G05B 19/40935
318/568.1
5,808,616 A * 9/1998 Shimizu .................. G06T 17/00
345/418
(Continued)

FOREIGN PATENT DOCUMENTS

DE    60201947 T2    11/2005
JP    7-88791 A      4/1995
(Continued)

OTHER PUBLICATIONS

Communication dated Aug. 13, 2014, from the German Patent and Trademark Office in counterpart German Application No. 112012001315.8.
(Continued)

*Primary Examiner* — Jason Lin
(74) *Attorney, Agent, or Firm* — Sughrue Mion, PLLC; Richard C. Turner

(57) ABSTRACT

In the invention, there are included a first image generating that generates image data corresponding to a shape data of a machining target as machining target image data, a second image generating that generates, based on NC programs created in the past, image data of a machining finish shape as finish shape image data, a storing that stores the finish shape image data associating with an NC program corresponding thereto, a similarity calculating that compares the machining target image data and the finish shape image data to calculate similarity of both the image data, a searching that searches, based on the similarity, candidates of finish shape image data similar to or matching the machining target image data and displays the candidates, and a first program
(Continued)

displaying that displays, out of the candidates of the finish shape image data, an NC program for designated finish shape image data.

12 Claims, 28 Drawing Sheets

(51) Int. Cl.
  *G06F 17/30* (2006.01)
  *G05B 19/4093* (2006.01)
(52) U.S. Cl.
  CPC ...... *G06K 9/00* (2013.01); *G05B 2219/36225* (2013.01); *G05B 2219/36337* (2013.01); *G06K 2209/19* (2013.01); *Y02P 90/265* (2015.11)

(56) References Cited

U.S. PATENT DOCUMENTS

| | | | | |
|---|---|---|---|---|
| 6,591,156 | B1* | 7/2003 | Fukaya | ............ G05B 19/40937 700/145 |
| 7,840,097 | B2 | 11/2010 | Furumoto | |
| 2002/0097906 | A1* | 7/2002 | Ishiyama | ............ G06K 9/00268 382/154 |
| 2003/0033048 | A1* | 2/2003 | Nakamura | ......... G05B 19/4093 700/182 |
| 2006/0013470 | A1 | 1/2006 | Nagatsuka et al. | |
| 2007/0276541 | A1* | 11/2007 | Sawasaki | ............ G05D 1/0246 700/253 |
| 2008/0056581 | A1* | 3/2008 | Yamaguchi | ........ G06F 17/30259 382/203 |
| 2008/0077259 | A1* | 3/2008 | Furumoto | ............... G06F 17/50 700/90 |
| 2010/0005943 | A1* | 1/2010 | Stein | ...................... G10D 1/005 84/267 |
| 2013/0311950 | A1* | 11/2013 | Kim | .................. G05B 19/40935 715/846 |

FOREIGN PATENT DOCUMENTS

| | | | | |
|---|---|---|---|---|
| JP | 9-62326 | A | 3/1997 | |
| JP | 10-49211 | A | 2/1998 | |
| JP | 2000-284820 | A | 10/2000 | |
| JP | 2001-255916 | A | 9/2001 | |
| JP | 2003-58215 | A | 2/2003 | |
| JP | 2006-26790 | A | 2/2006 | |
| JP | 2008-217220 | A | 9/2008 | |
| JP | 5020412 | B1* | 9/2012 | ....... G05B 19/40931 |
| KR | 2012085420 | A* | 8/2012 | ........... G05B 19/409 |
| KR | 20120085420 | A | 8/2012 | |

OTHER PUBLICATIONS

Communication dated Apr. 11, 2016 from the State Intellectual Property Office of the P.R.C. in counterpart Chinese application No. 201280018451.7.

Communication dated Oct. 9, 2015, issued by The State Intellectual Property Office of the People's Republic of China in corresponding application No. 201280018451.7.

* cited by examiner

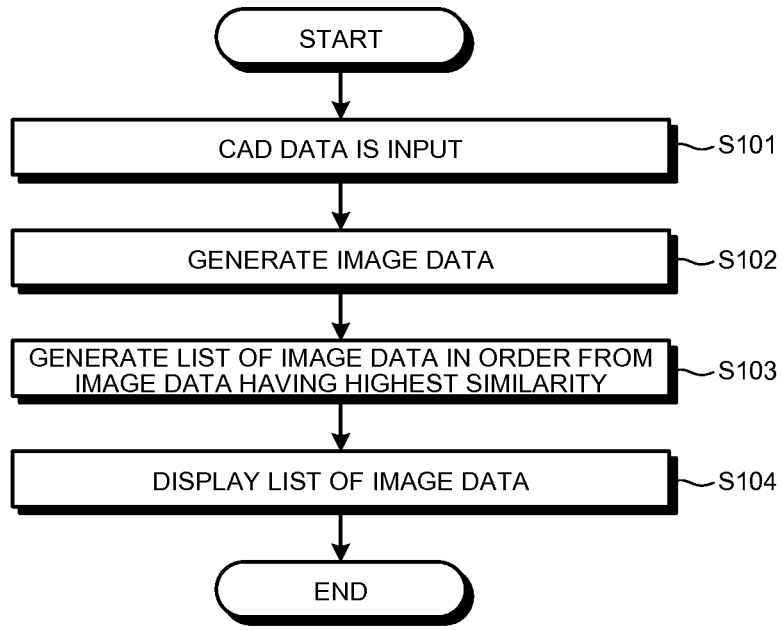
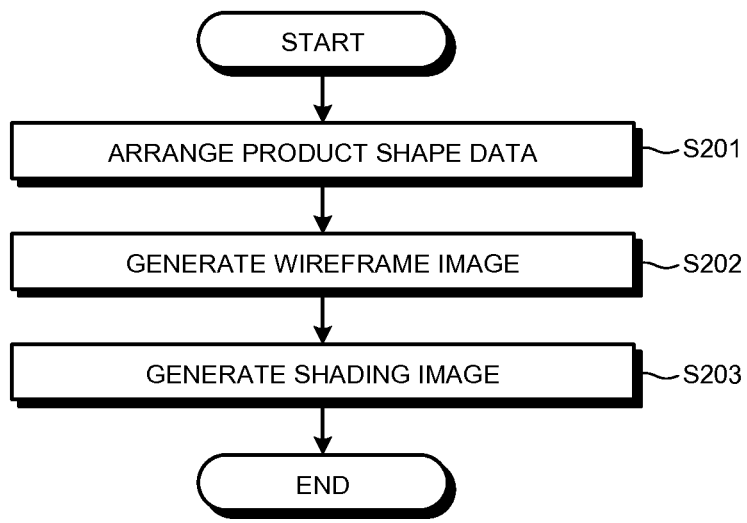

FIG.29
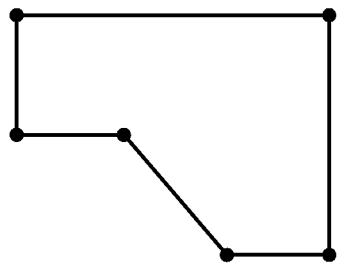
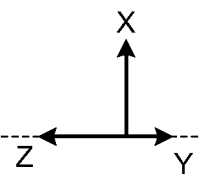
FIG.30
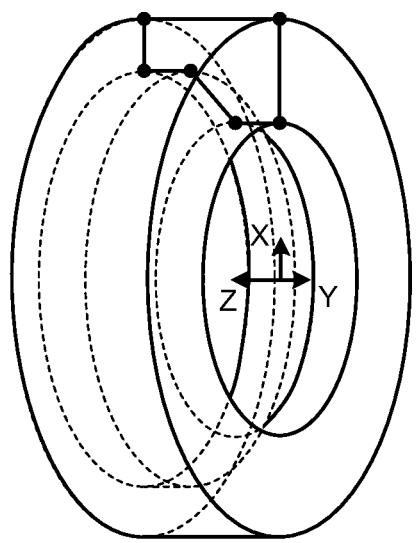

```
DRILL
HOLE DIAMETER 12 HOLE DEPTH 30
CHAMFERING 2
MACHINING POSITION (30.0, 0.0, 30.0)
```

```
DRILL
HOLE DIAMETER 12  HOLE DEPTH 30
CHAMFERING 2
MACHINING POSITION (30.0, 0.0, 30.0)
```

FIG.51

```
DRILL 1
HOLE DIAMETER 12 HOLE DEPTH 30
CHAMFERING 2
MACHINING POSITION (30.0, 20.0, 30.0)

DRILL 2
HOLE DIAMETER 12 HOLE DEPTH 30
CHAMFERING 2
MACHINING POSITION (30.0, -20.0, 30.0)
```

NC PROGRAM SEARCHING METHOD, NC PROGRAM SEARCHING UNIT, NC PROGRAM CREATING METHOD, AND NC PROGRAM CREATING UNIT

CROSS REFERENCE TO RELATED APPLICATIONS

This application is a National Stage of International Application No. PCT/JP2012/081978, filed on Dec. 10, 2012, the contents of all of which are incorporated herein by reference in their entirety.

FIELD

The present invention relates to an NC program searching method, an NC program searching unit, an NC program creating method, and an NC program creating unit that search an NC program for numerically controlling machine tools.

BACKGROUND

There are program creating unites as unites that create NC programs (numerical control machining programs) for numerically controlling machine tools. Among such program creating unites, there is a program creating unit having a function of supporting creation when an NC program is created (a creation supporting function).

In recent years, the creation supporting function has been enhanced. An operator can easily create an NC program by setting coordinate values of a machining target object while looking at manufacturing drawings. A program creating unit has also been developed that can directly read CAD data modeled by a designer using a CAD system and create an NC program. Because the capacity of an internal memory of a numerical control unit in these days is increased, the numerical control unit can store a large number of NC programs in the internal memory. Therefore, the operator selects a necessary NC program according to work to be machined and edits the NC program according to the work to be machined. For a similar product, the operator streamlines creation of an NC program by using an NC program for a product in the past.

However, because an NC program creating unit in the past does not have a function for enabling the use of an NC program created in the past, NC programs need to be created for all products according to the same procedure. Therefore, efficiency in creating an NC program is not considered to be sufficient.

A searching unit described in Patent Literature 1 stores in advance, concerning a plurality of products, machining element data including shape features of workpieces and shape features and machining types of machining areas, and tool related data, as programming basic data. The searching unit generates, based on three-dimensional shape data of a machining target product and a workpiece, machining element data of the machining target product, searches, based on the generated machining element data, the stored programming basic data, and extracts programming basic data of a product similar to the machining target product.

A managing unit for a program described in Patent Literature 2 stores NC programs, photographs related to the NC programs, and program information in association with one another. The managing unit causes an operator to input the photographs, a machining result, and the like as search information. Consequently, the managing unit extracts, based on the search information, a desired NC program out of the stored NC programs.

CITATION LIST

Patent Literature

Patent Literature 1: Japanese Patent Application Laid-open No. 2003-58215
Patent Literature 2: Japanese Patent Application Laid-open No. 2001-255916

SUMMARY

Technical Problem

However, in the former related technology, the searching unit has to generate the machining element data based on the three-dimensional shape data. Therefore, the searching unit can be used only in a machining element data unit. In searching the stored programming basic data, the searching unit searches the programming basic data based on consistency of the shape of the workpiece and the like or a dimension difference. Therefore, there is a problem in that desired search cannot be performed unless an operator sets satisfactory search conditions.

In the latter related technology, the operator needs to input NC programs, photographs of workpieces, machining results, and the like. Therefore, search processing takes labor and time. Further, because the NC programs and the machining results are simply associated, there is a problem in that the operator has to find out a machining result by himself or herself out of machining results associated with a large number of NC programs.

The present invention has been devised in view of the above and it is an object of the present invention to obtain an NC program searching method, an NC program searching unit, an NC program creating method, and an NC program creating unit that can easily and efficiently perform search of an NC program.

Solution to Problem

To solve the above-mentioned problems, and to achieve the objective, an NC program searching method according to one aspect of the present invention includes a first image generating step for generating, when shape data of a machining target is input from an outside, image data corresponding to the shape data of the machining target as machining target image data, a second image generating step for generating, based on NC programs created in the past, image data of a machining finish shape as finish shape image data, a storing step for storing the finish shape image data in association with an NC program corresponding thereto, a similarity calculating step for comparing the machining target image data and the finish shape image data to thereby calculate similarity of both the image data, a searching step for searching, based on the similarity, candidates of finish shape image data similar to or matching the machining target image data and displaying the candidates, and a first program displaying step for displaying, out of the candidates of the finish shape image data, an NC program for finish shape image data designated by the external input.

Advantageous Effects of Invention

According to the present invention, there is an effect that it is possible to easily and efficiently perform search of an NC program.

BRIEF DESCRIPTION OF DRAWINGS

FIG. 2 is a flowchart for explaining an operation processing procedure of the NC program creating unit according to the embodiment.

FIG. 3 is a flowchart for explaining an operation processing procedure of an image-data generating section.

FIG. 29 is a diagram of an example of a lathe turning cross-sectional shape.

FIG. 30 is a diagram of an example of a removal shape of the lathe turning.

FIG. 51 is a diagram of an example of an NC program configured by the inserted and moved drilling and the copied, inserted, and moved drilling.

DESCRIPTION OF EMBODIMENTS

An NC program searching method, an NC program searching unit, an NC program creating method, and an NC program creating unit according to an embodiment of the present invention are explained in detail below based on the drawings. The present invention is not limited by the embodiment.

Embodiment

Figure 1:
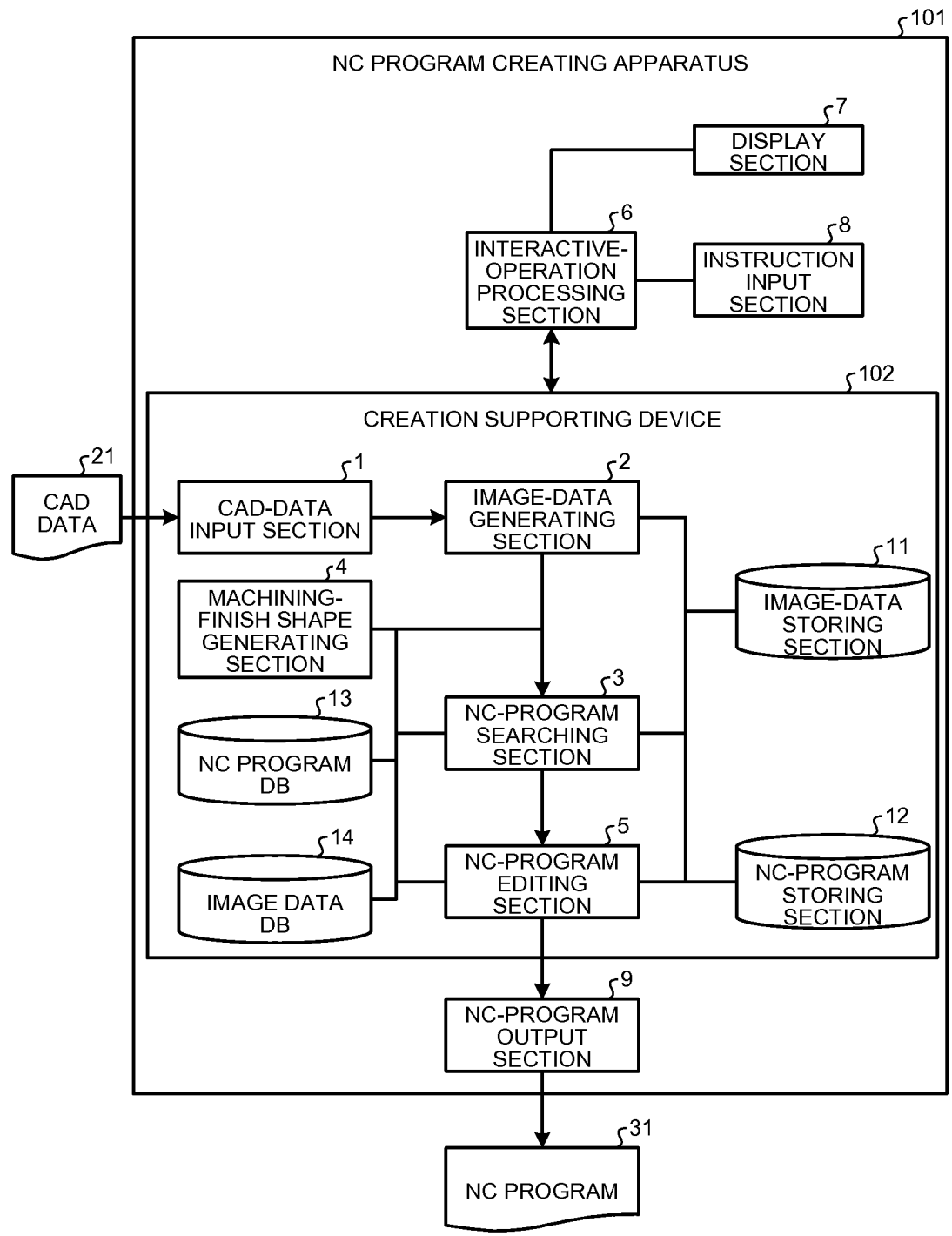
FIG. 1 is a block diagram of the configuration of an NC program creating unit according to an embodiment.

FIG. 1 is a block diagram of the configuration of an NC program creating unit according to an embodiment. An NC program creating unit (a numerical control machining programming unit) 101 is an unit that creates a numerical control machining (NC) program. The NC program is a program used in causing a machine to perform NC machining according to numerical control. An NC control unit, that performs the NC machining, forms a product having a machining finish shape (a workpiece after machining) by machining a workpiece to be machined (a workpiece before machining).

The NC program creating unit 101 includes a creation supporting device 102, an interactive-operation processing section 6, a display section 7, an instruction input section 8, and an NC-program output section 9. The creation supporting device 102 includes a CAD-data input section 1, an image-data generating section 2, an NC-program searching section 3, a machining-finish-shape generating section 4, an NC-program editing section 5, an image-data storing section 11, an NC-program storing section 12, an ND program DB (Database) 13, and an image data DB 14.

The interactive-operation processing section 6 is connected to the display section 7, the instruction input section 8, and the creation supporting device 102. The NC-program output section 9 is connected to the creation supporting device 102.

In the NC program creating unit 101, for example, the image-data generating section 2, the NC-program searching section 3, the machining-finish-shape generating section 4, the NC-program editing section 5, the interactive-operation processing section 6, and the NC-program output section 9 are configured by software.

The CAD (Computer Aided Design)-data input section 1 receives CAD data 21 from an external unit or the like such as a CAD system (not shown in the figure) or a CAD data storage device (not shown in the figure) and sends the CAD data 21 to the image-data generating section 2.

The CAD data 21 includes, for example, information concerning a product, information concerning a workpiece, and information concerning a machining instruction used in forming the product from the workpiece. The information concerning a product in the CAD data 21 includes, for example, shape data of the product. The shape data of the product (hereinafter referred to as product shape data) is generated using a CAD system or the like and includes information indicating the shape and the dimension of the product. The information concerning a workpiece in the CAD data 21 includes data concerning the material and the dimension of the workpiece. The information concerning a machining instruction in the CAD data 21 includes data of an area to be removed by machining (a machining area) in the workpiece.

The image-data generating section 2 generates image data (machining target image data) of a product using the CAD data 21 and stores the image data of the product in the image-data storing section 11. The image data of the product is data of an image formed by two-dimensionally or three-dimensionally displaying the shape of the product. The image-data storing section 11 is a memory or the like configured to store the image data generated by the image-data generating section 2.

The display section 7 is a display terminal such as a liquid crystal monitor. The display section 7 displays the CAD data 21, a figure element of product shape data designated by an operator, data concerning machining, or the like. The instruction input section 8 includes a mouse and a keyboard. Instruction information or the like from the operator (a worker) is input to the instruction input section 8. The input instruction information is sent to the interactive-operation processing section 6.

The interactive-operation processing section 6 causes the display section 7 to display the CAD data 21 input to the CAD-data input section 1. The instruction information from the instruction input section 8 is input to the interactive-operation processing section 6. The interactive-operation processing section 6 receives, from the instruction input section 8, as instruction information, for example, image data designated by the operator using the mouse or the like. The interactive-operation processing section 6 receives, based on the instruction information from the instruction input section 8, editing of an NC program. The interactive-operation processing section 6 causes the NC-program editing section 5 to perform the editing according to the instruction information and stores the NC program after the editing in the NC-program storing section 12.

The NC-program storing section 12 is a memory or the like configured to store the NC program before the editing and the NC program after the editing. The NC-program storing section 12 stores an NC program input from the NC program DB 13 by the NC-program editing section 5 and an NC program edited by the NC-program editing section 5.

The NC-program searching section 3 compares image data stored in the image-data storing section 11 and image data stored in the image data DB 14 to thereby calculate similarity between both of the image data. The NC-program searching section 3 generates, based on the calculated similarity, a list of image data having high similarities. The list of the image data generated by the NC-program searching section 3 is displayed by the display section 7.

The NC program DB 13 is a database configured to store NC programs in the past. The image data DB 14 is a database configured to store image data (finish shape image data) corresponding to the NC programs in the past stored by the NC program DB 13. The image data DB 14 stores in advance a correspondence relation between NC programs created in the past and image data corresponding to the NC program.

The NC-program editing section 5 acquires, from the NC program DB 13, an NC program linked to image data designated by the operator and stores the NC program in the NC-program storing section 12. The image data designated by the operator is image data designated by the operator from the list of the image data, which is displayed on the display section 7, via the instruction input section 8. The image data designated by the operator is notified to the NC-program editing section 5 via the instruction input section 8 and the interactive-operation processing section 6. Consequently, the NC-program editing section 5 reads out an NC program corresponding to the notified image data from the NC program DB 13.

The NC-program editing section 5 edits the NC program stored in the NC-program storing section 12 according to an instruction from the operator. The editing instruction by the operator is an instruction input to the NC program, which is displayed on the display section 7, by the operator via the instruction input section 8. The editing instruction input by the operator is notified to the NC-program editing section 5 via the instruction input section 8 and the interactive-operation processing section 6. Consequently, the NC-program editing section 5 performs editing processing corresponding to the notified editing instruction. The NC-program editing section 5 stores the NC program after the editing in the NC-program storing section 12 and the NC program DB 13.

When image data corresponding to the NC program stored in the NC program DB 13 is absent in the image data DB 14, the machining-finish-shape generating section 4 generates image data of a machining finish shape from the NC program. The machining-finish-shape generating section 4 inputs the NC program from the NC program DB 13 and generates a machining finish shape using the input NC program. The machining-finish-shape generating section 4 stores the generated machining finish shape in the image data DB 14.

The NC-program output section 9 reads out, from the NC-program storing section 12, an NC program instructed by the operator to be output and outputs the NC program to the outside as an NC program 31. The output instruction for the NC program by the operator is an instruction input to the NC program, which is displayed on the display section 7, by the operator via the instruction input section 8. The output instruction input by the operator is notified to the NC-program editing section 5 via the instruction input section 8 and the interactive-operation processing section 6. Consequently, the NC-program editing section 5 reads out the NC program corresponding to the notified output instruction from the NC-program storing section 12 and sends the NC program to the NC-program output section 9.

The NC program creating unit 101 is sometimes built in a personal computer or an NC unit without being built as the NC program creating unit per se. A hardware configuration of the NC program creating unit 101 is substantially the same as a general personal computer including a CPU (Central Processing Unit) and a memory.

Operation processing of the NC program creating unit 101 is explained. FIG. 2 is a flowchart for explaining an operation processing procedure of the NC program creating unit according to the embodiment. The CAD data 21 is input to the CAD-data input section 1 (step S101). The CAD-data input section 1 sends the CAD data 21 to the image-data generating section 2.

Consequently, the image-data generating section 2 generates image data of a product corresponding to the CAD data 21 (step S102). The image-data generating section 2 stores the generated image data in the image-data storing section 11.

The NC-program searching section 3 compares the image data generated by the image-data generating section 2 and the image data in the past stored in the image data DB 14 to thereby calculate similarities between both of the image data. The NC-program searching section 3 generates, based on the calculated similarities, an image data list in which candidates of the image data are arranged in order from the image data having the highest similarity (step S103). The image data list generated by the NC-program searching section 3 is displayed by the display section 7 (step S104).

Processing of the image-data generating section 2 is explained. FIG. 3 is a flowchart for explaining an operation processing procedure of the image-data generating section. The image-data generating section 2 extracts product shape data from the CAD data 21 input to the CAD-data input section 1 and arranges the product shape data in a direction corresponding to a machining characteristic (step S201).

Subsequently, the image-data generating section 2 generates a wireframe image from the product shape data (step S202). Thereafter, the image-data generating section 2 generates a shading image from the product shape data (step S203).

The image-data generating section 2 generates the wireframe image from the product shape data by, for example, mathematically analyzing edges and silhouettes from the product shape data. Specifically, the image-data generating section 2 combines a eye orientation vector explained below and an upward orientation vector of a screen explained below from a viewpoint position sufficiently apart from the product (the product shape data) to generate image data. The image-data generating section 2 generates the wireframe image by scaling the generated image data to be fit within an image data frame.

The image-data generating section 2 generates the shading image by, for example, shading, based on an arbitrary light source, a shape defined by the product shape data. Specifically, the image-data generating section 2 combines the eye orientation vector explained below and the upward orientation vector of the screen explained below from the viewpoint position sufficiently apart from the product (the product shape data) to generate image data. The image-data generating section 2 generates the wireframe image by scaling the generated image data to be fit within the image data frame.

The eye orientation vector is a orientation vector from the viewpoint position. Image data of combinations of all eye directions are not always necessary. In the case of turning machining, for example, image data of a front surface, a back surface, a left side surface, a right side surface, an upper surface, and a lower surface only has to be generated.

Front surface: Eye orientation vector (0, 0, 1), upper orientation vector of the screen (1, 0, 0)

Back surface: Eye orientation vector (0, 0, −1), upper orientation vector of the screen (1, 0, 0)

Left side surface: Eye orientation vector (0, 1, 0), upper orientation vector of the screen (1, 0, 0)

Right side surface: Eye orientation vector (0, −1, 0), upper orientation vector of the screen (1, 0, 0)

Upper surface: Eye orientation vector (−1, 0, 0), upper orientation vector of the screen (0, 1, 0)

Lower surface: Eye orientation vector (1, 0, 0), upper orientation vector of the screen (0, −1, 0)

Upper left front surface: Eye orientation vector (−1, 1, 1), upper orientation vector of the screen (1, 0, 0)

Lower left front surface: Eye orientation vector (1, 1, 1), upper orientation vector of the screen (1, 0, 0)

Upper right front surface: Eye orientation vector (−1, −1, 1), upper orientation vector of the screen (1, 0, 0)

Lower right front surface: Eye orientation vector (1, −1, 1), upper orientation vector of the screen (1, 0, 0)

Upper left back surface: Eye orientation vector (−1, 1, −1), upper orientation vector of the screen (1, 0, 0)

Lower left back surface: Eye orientation vector (1, 1, −1), upper orientation vector of the screen (1, 0, 0)

Upper right back surface: Eye orientation vector (−1 −1, −1), upper orientation vector of the screen (1, 0, 0)

Lower right back surface: Eye orientation vector (1, −1, −1), upper orientation vector of the screen (1, 0, 0)

The processing for arranging the product shape data in the direction corresponding to the machining characteristic (step S201) is explained. As machining for workpiece, there is, for example, round object machining for performing lathe turning or square object machining for performing milling.

Figure 4:
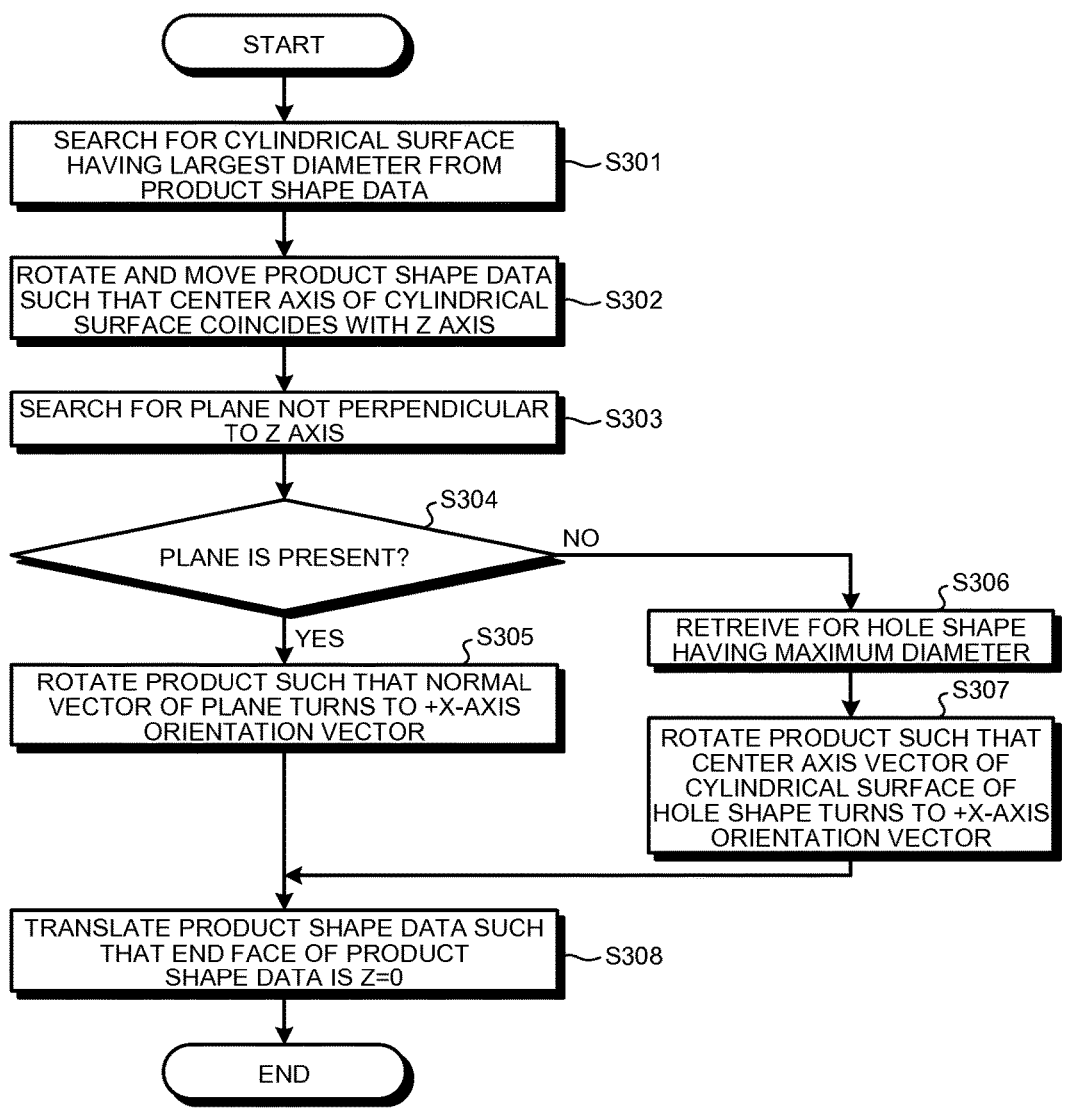
FIG. 4 is a flowchart for explaining an arrangement processing procedure for product shape data arranged when turning machining is performed.
Figure 5:
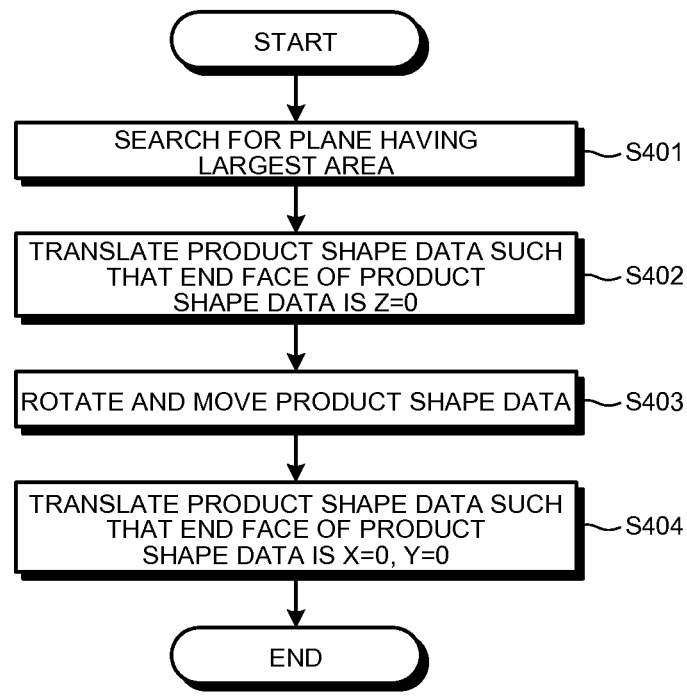
FIG. 5 is a flowchart for explaining an arrangement processing procedure product shape data arranged when milling object machining is performed.
Figure 6:
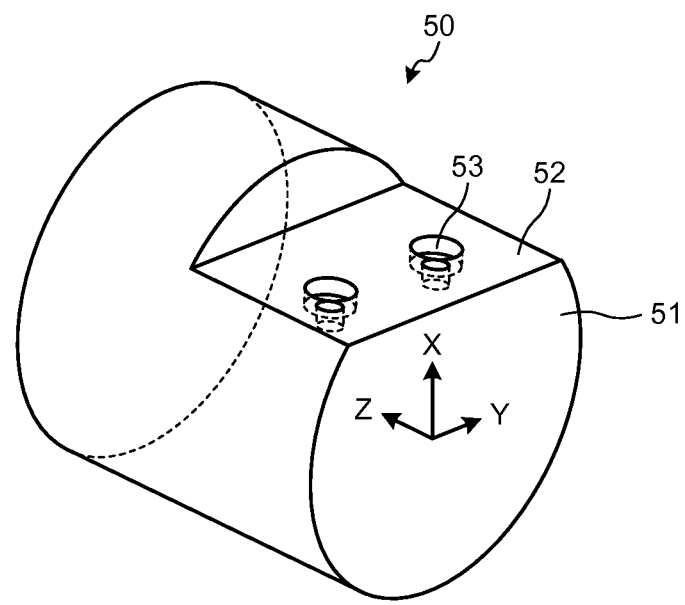
FIG. 6 is a diagram of an arrangement example of the product shape data arranged when the turning machining is performed.
Figure 7:
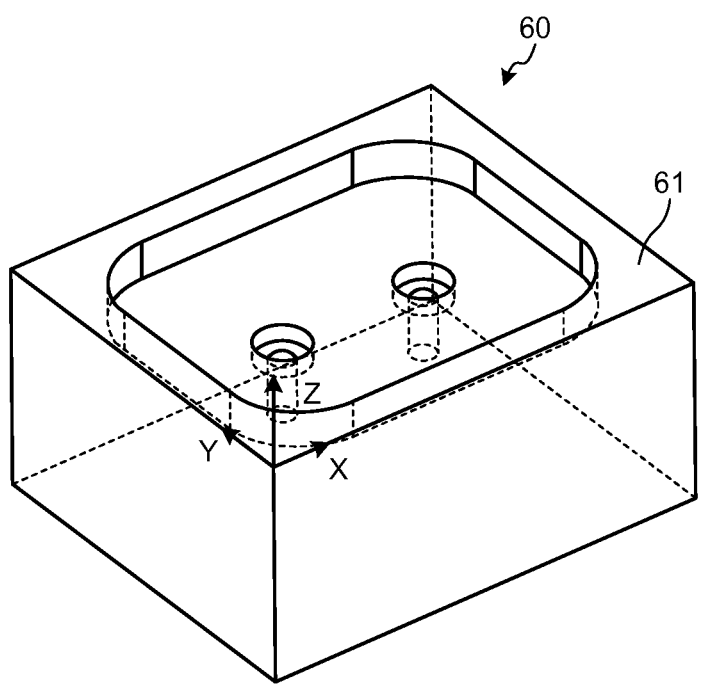
FIG. 7 is a diagram of an arrangement example of the product shape data arranged when milling machining is performed.

FIG. 4 is a flowchart for explaining arrangement processing procedure for the product shape data arranged when the turning machining is performed. FIG. 5 is a flowchart for explaining an arrangement processing procedure for the product shape data arranged when milling machining is performed. FIG. 6 is a diagram of an arrangement example of the product shape data arranged when the turning machining is performed. FIG. 7 is a diagram of an arrangement example of the product shape data arranged when milling machining is performed. A target of the turning machining is a turning machining workpiece 50 and a target of milling machining is a milling machining workpiece 60.

When the machining for the workpiece is the round object machining for performing lathe turning, the image-data generating section 2 searches for a cylindrical surface having the largest diameter (hereinafter referred to as largest cylindrical surface) from the product shape data in the CAD data 21 (step S301). The image-data generating section 2 rotates and moves the product shape data such that the center axis (the cylinder axis) of the largest cylindrical surface 51 coincides with the Z axis (step S302).

Subsequently, the image-data generating section 2 searches for a plane not perpendicular to the Z axis from the CAD data. The image-data generating section 2 searches for a plane (a plane unparallel to the upper surface of the cylinder) 52 not perpendicular to the center axis of the largest cylindrical surface 51. Where a plurality of planes not perpendicular to the center axis of the largest cylindrical surface 51 are present, the image-data generating section 2 searches for, for example, a plane having a largest area (step S303).

When the plane (the plane unparallel to the upper surface of the cylinder) 52 not perpendicular to the center axis of the largest cylindrical surface 51 is present (Yes at step S304), the image-data generating section 2 rotates the product (the product shape data) (the Turning machining workpiece 50) around the center axis of the largest cylindrical surface 51 (the Z axis) such that the normal vector of the plane 52 turns to a +X-axis orientation vector (1, 0, 0) and a Y value is 0 and an X value is a positive value (step S305).

When the plane not perpendicular to the center axis of the largest cylindrical surface 51 (the Z axis) is absent (No at step S304), the image-data generating section 2 searches a hole shape from the CAD data. When a plurality of hole shapes are present, the image-data generating section 2 searches a hole shape having the largest diameter (step S306).

The image-data generating section 2 rotates the product based on the position of a hole 53 formed on the largest cylindrical surface 51. For example, when the shape of the hole 53 is a cylindrical shape, the image-data generating section 2 rotates the product around the center axis of the largest cylindrical surface 51 such that the center axis vector of a cylindrical surface forming the hole 53 (a sidewall surface of the hole 53) turns to the +X-axis orientation vector (1, 0, 0) and a Y value is 0 (step S307).

In this case, when a plurality of hole shapes are present, the image-data generating section 2 rotates a cylindrical surface of a hole shape having the largest diameter. After rotating the product shape data such that the normal vector of the plane or the center axis vector of the cylindrical surface of the hole shape turns to the +X-axis orientation vector, the image-data generating section 2 translates the product shape data along the Z axis such that a Z value of a position vector of an end point or an end surface in a −Z-axis direction of the product (the CAD data) is Z=0 (step S308).

When the machining for the workpiece is milling machining for performing the milling, the image-data generating section 2 searches for a plane 61 having the largest area from the product shape data in the CAD data 21 (step S401).

The image-data generating section 2 translates the product shape data (the CAD data) along the Z axis such that a Z value of a position vector of an end point or an end face in a +Z-axis direction of the product shape data is 0 (step S402).

Subsequently, the image-data generating section 2 rotates and moves the product shape data such that the longitudinal direction of the product shape data is in an X-axis direction (1, 0, 0) (step S403). The image-data generating section 2 translates the product shape data along the X axis such that an X value of a position vector of an end point or an end face in a −X-axis direction of the product shape data is X=0. Further, the image-data generating section 2 translates the product shape data along the Y-axis such that a Y value of a position vector of an end point or an end face in a −Y-axis direction of the product shape data is Y=0 (step S404). The image-data generating section 2 stores the generated shading image in the image data DB 14 as finish shape image data.

Figure 8:
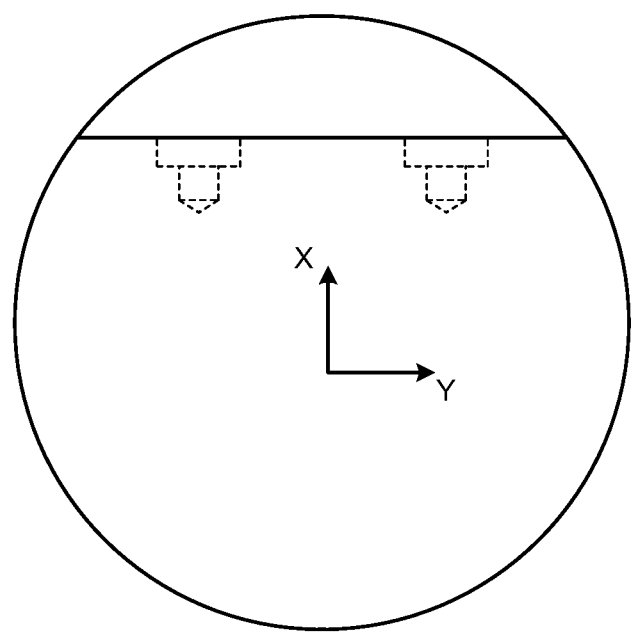
FIG. 8 is a diagram of an example of image data of a front surface.
Figure 9:
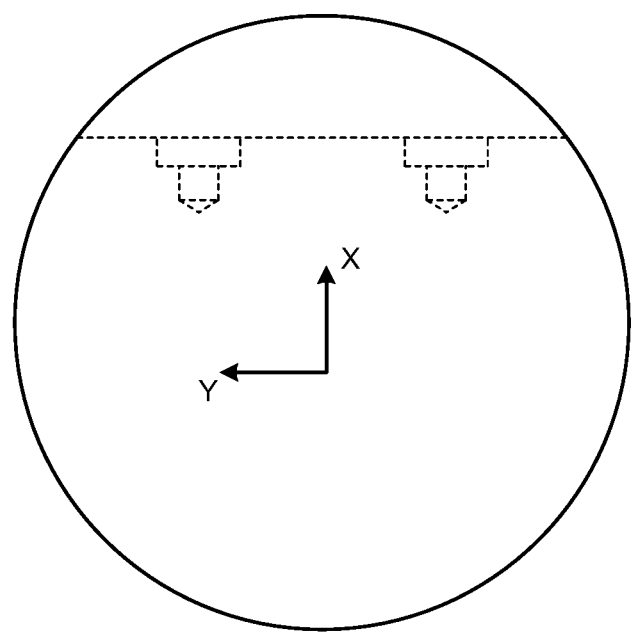
FIG. 9 is a diagram of an example of image data of a back surface.
Figure 10:
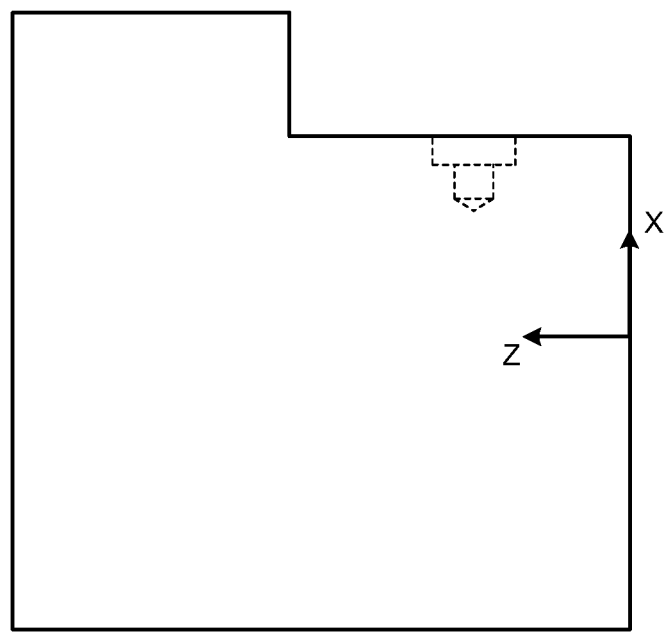
FIG. 10 is a diagram of an example of image data of a left side surface.
Figure 11:
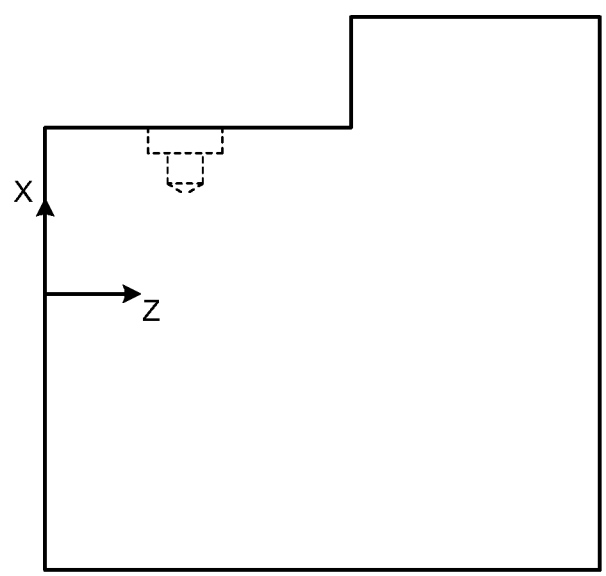
FIG. 11 is a diagram of an example of image data of a right side surface.
Figure 12:
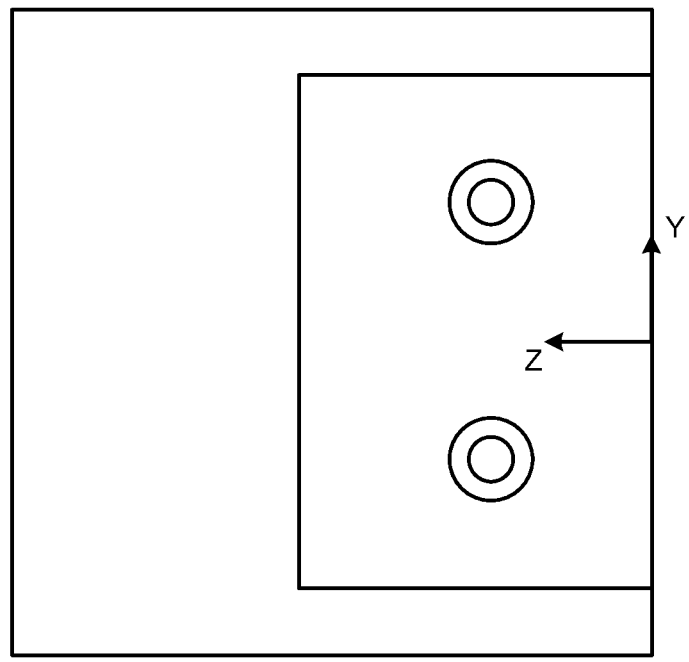
FIG. 12 is a diagram of an example of image data of an upper surface.
Figure 13:
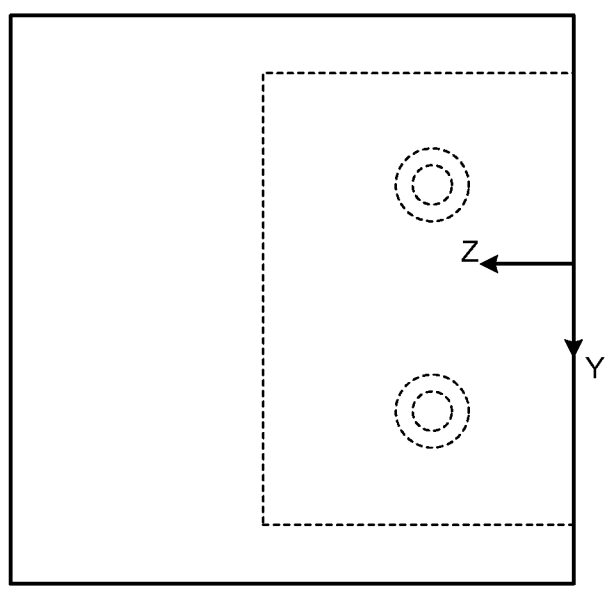
FIG. 13 is a diagram of an example of image data of a lower surface.
Figure 14:
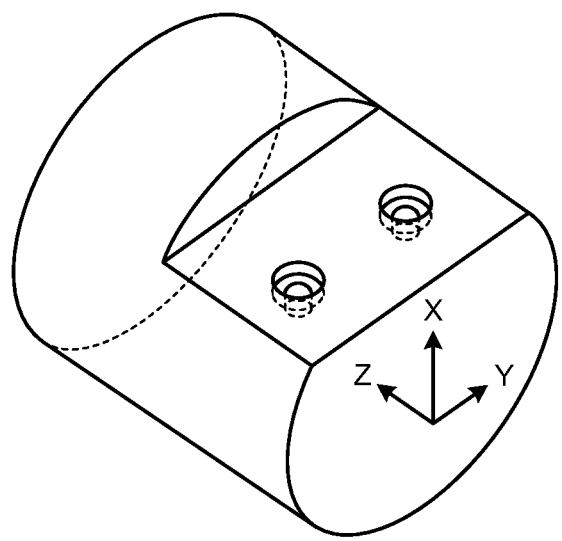
FIG. 14 is a diagram of an example of image data of an upper left front surface.
Figure 15:
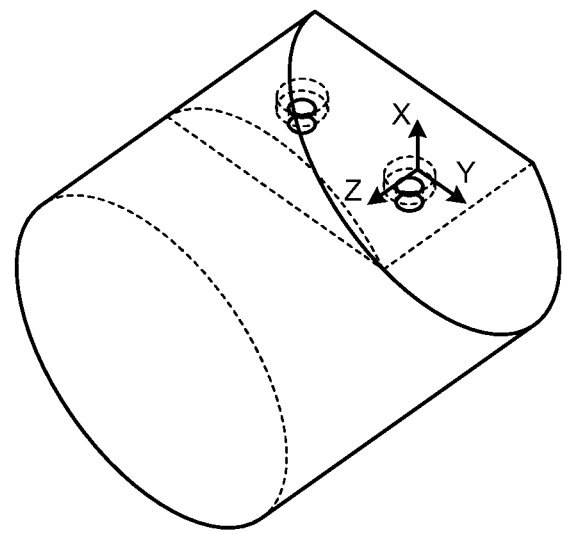
FIG. 15 is a diagram of an example of image data of a lower left front surface.
Figure 16:
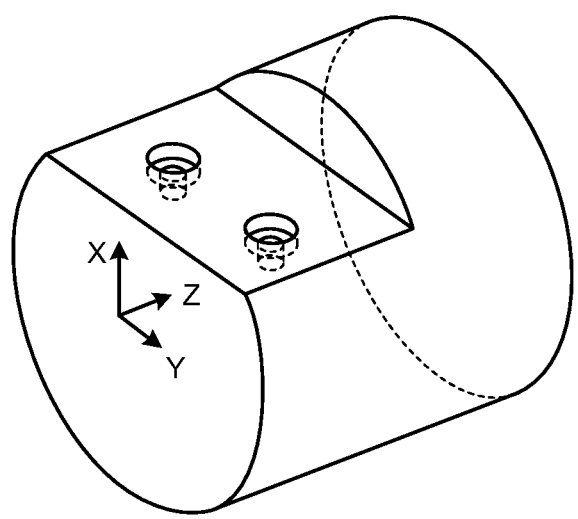
FIG. 16 is a diagram of an example of image data of an upper right front surface.
Figure 17:
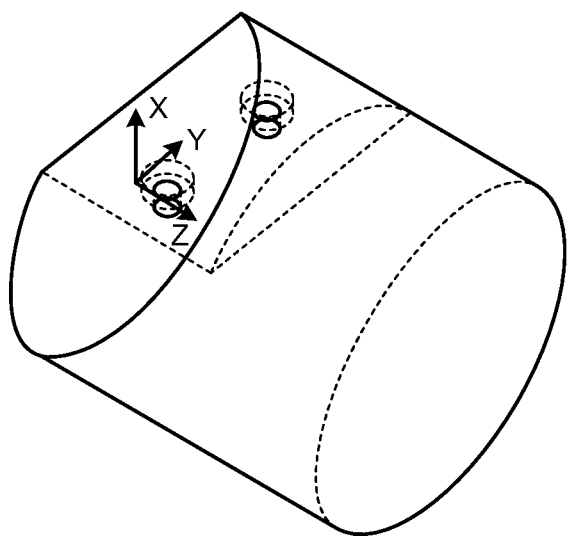
FIG. 17 is a diagram of an example of image data of a lower right front surface.

FIG. 8 is a diagram of an example of image data of a front surface. FIG. 9 is a diagram of an example of image data of a back surface. FIG. 10 is a diagram of an example of image data of a left side surface. FIG. 11 is a diagram of an example of image data of a right side surface. FIG. 12 is a diagram of an example of image data of an upper surface. FIG. 13 is a diagram of an example of image data of a lower surface. FIG. 14 is a diagram of an example of image data of an upper left front surface. FIG. 15 is a diagram of an example of image data of a lower left front surface. FIG. 16 is a diagram of an example of image data of an upper right front surface. FIG. 17 is a diagram of an example of image data of a lower right front surface.

Figure 18:
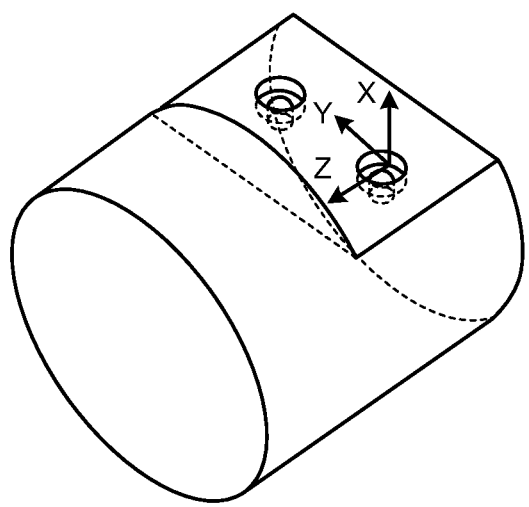
FIG. 18 is a diagram of an example of image data of an upper left back surface.
Figure 19:
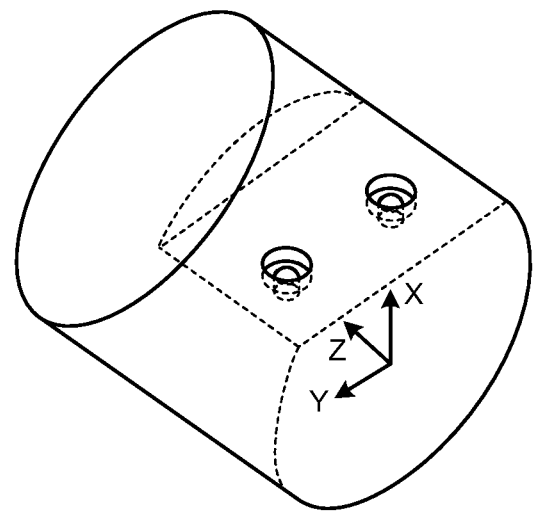
FIG. 19 is a diagram of an example of image data of a lower left back surface.
Figure 20:
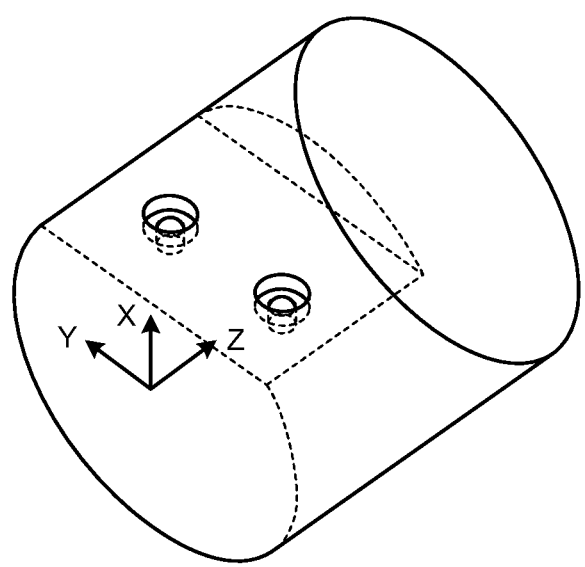
FIG. 20 is a diagram of an example of image data of an upper right back surface.
Figure 21:
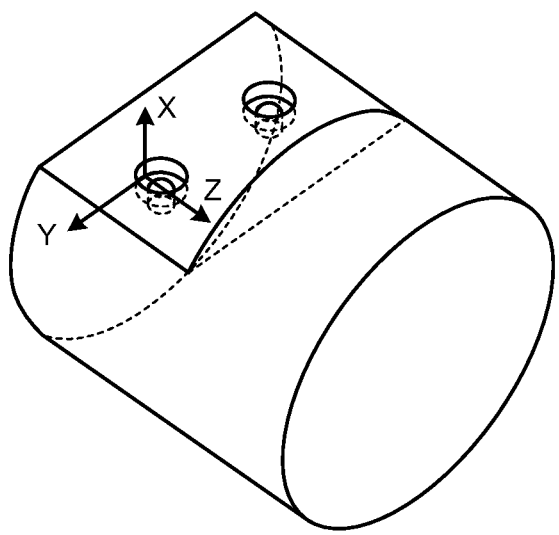
FIG. 21 is a diagram of an example of image data of a lower right back surface.

FIG. 18 is a diagram of an example of image data of an upper left back surface. FIG. 19 is a diagram of an example of image data of a lower left back surface. FIG. 20 is a diagram of an example of image data of an upper right back surface. FIG. 21 is a diagram of an example of image data of a lower right back surface. Each of the image data shown in FIGS. 8 to 21 corresponds to the image data of the Turning machining workpiece 50 shown in FIG. 6.

The operation of the NC-program searching section 3 is explained. The NC-program searching section 3 sets image data in one or a plurality of eye directions, which is generated by the image-data generating section 2, as an original image and extracts one or a plurality of image data in the same eye direction as a target image out of the image data of the image data DB 14. In other words, image data having a eye direction same as a eye direction of the image data generated by the image-data generating section 2 is extracted from the image data DB 14 as a target image. The NC-program searching section 3 calculates similarity between the extracted target image and the original image.

The NC-program searching section 3 generates, based on the calculated similarity, a list of image data in order from the image data having the highest similarity. When image data corresponding to the NC program stored in the NC program DB 13 is absent in the image data DB 14, the machining-finish-shape generating section 4 generates a machining finish shape from the NC program. The image-data generating section 2 generates image data from the generated machining finish shape and stores the image data in the image data DB 14.

When at least one of the material of a workpiece, a machining type, a tool type, and a cutter diameter is input from the instruction input section 8 as narrowing-down information concerning an NC program used in machining a machining target, the NC-program searching section 3 can extract an NC program corresponding to the narrowing-down information out of NC programs created in the past. In this case, the NC-program searching section 3 calculates similarity by using image data corresponding to the extracted NC program. Consequently, it is possible to execute search of an NC program in a short time.

Figure 22:
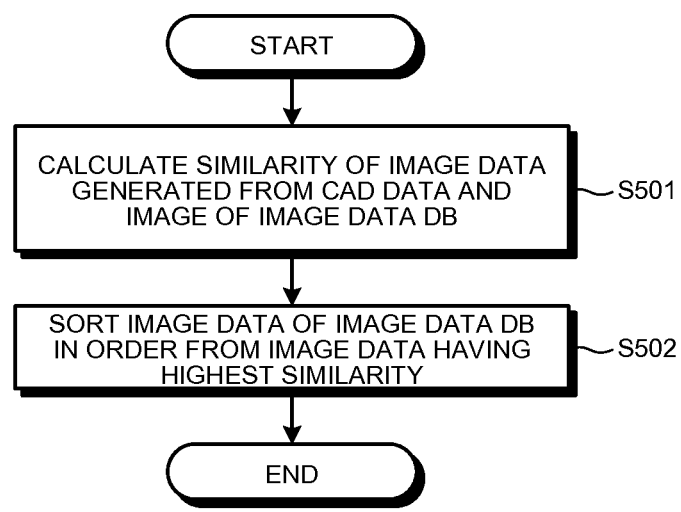
FIG. 22 is a flowchart for explaining a generation processing procedure for a list of image data arranged in order from the image data having the highest similarity.

It is explained on the generation processing for an image data list in which image data are arranged in order from the image data having the highest similarity (the processing at step S103). FIG. 22 is a flowchart for explaining a generation processing procedure for an image data list in which image data are arranged in order from the image data having the highest similarity.

The NC-program searching section 3 compares the image data generated at step S102 and stored in the image-data storing section 11 and the image data of the machining finish shape generated by the machining-finish-shape generating section 4 and stored in the image data DB 14 and calculates similarity (step S501).

For example, the NC-program searching section 3 compares an original image and a target image and calculates similarity based on a matching number and a matching rate between pixels rendered on the original image and pixels rendered on the target image. For example, the NC-program searching section 3 sets a total number of pixels rendered on the image data generated by the image-data generating section 2 as a denominator and sets the number of pixels rendered in the same parts as a numerator, and thereby calculates similarity. In other words, the NC-program searching section 3 sets, as similarity, a value obtained by dividing the number of pixels matching between the original image and the target image by a total number of pixels of the original image. When the similarity is calculated by this method, the similarity is 1 when all the pixels match between the original image and the target image. And, the similarity is 0 when all the pixels do not match.

The NC-program searching section 3 can calculate similarity by comparing a shape dimension of the original image (a first shape dimension) and a shape dimension of the target image (a second shape dimension). In this case, the NC-program searching section 3 can calculate the shape dimension of the original image based on shape data of the product (the machining target) or can calculate the shape dimension of the original image based on the machining target image data. The NC-program searching section 3 calculates the shape dimension of the target image based on the finish shape image data.

For example, the NC-program searching section 3 calculates similarity by comparing positions of edges of the original image and the target image. In this case, the NC-program searching section 3 calculates, for example, a distance on the images between an edge of the original image and a closest edge of the target image. The NC-program searching section 3 sets similarities corresponding to distances among the respective edges and derives a distribution of similarities (distances) among the respective edges. Further, the NC-program searching section 3 calculates similarity based on the derived distribution of similarity values.

For example, the NC-program searching section 3 sets a similarity value to 1 when the distances among the respective edges are 0, sets a similarity value to 0.9 when the distances are 1, and sets a similarity value to 0.8 when the distances are 2. In this way, the NC-program searching section 3 sets the similarity values corresponding to the distances such that the similarity value decreases as the distances among the respective edges increase and the similarity value is 0 when the distances are equal to or larger than 10. For example, the NC-program searching section 3 sets an average of the similarity values among the edges as similarity. When the similarity is calculated by this method, the similarity is 1 when the images match between the original image and the target image. And, the similarity is 0 when the images do not match at all.

The NC-program searching section 3 can calculate similarity by comparing positions of edge end points of the original image and the target image. In this case, as the same as in the case of the comparison of the positions of the edges, the NC-program searching section 3 calculates distances among the edge end points of the original image and the target image. The NC-program searching section 3 sets the similarity values corresponding to the calculated distances among the respective edge points and derives a distribution of the similarity values (the distances) among the respective edge end points. Further, the NC-program searching section 3 calculates similarity based on the derived distribution of the similarity values. The NC-program searching section 3 can calculate similarity by comparing the positions of both of the edges and the edge end points of the original image and the target image.

Figure 23:
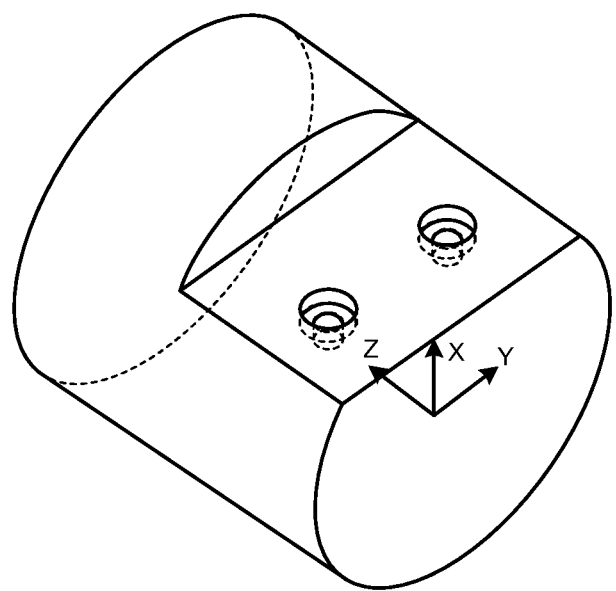
FIG. 23 is a diagram of an example of a machining finish shape.
Figure 24:
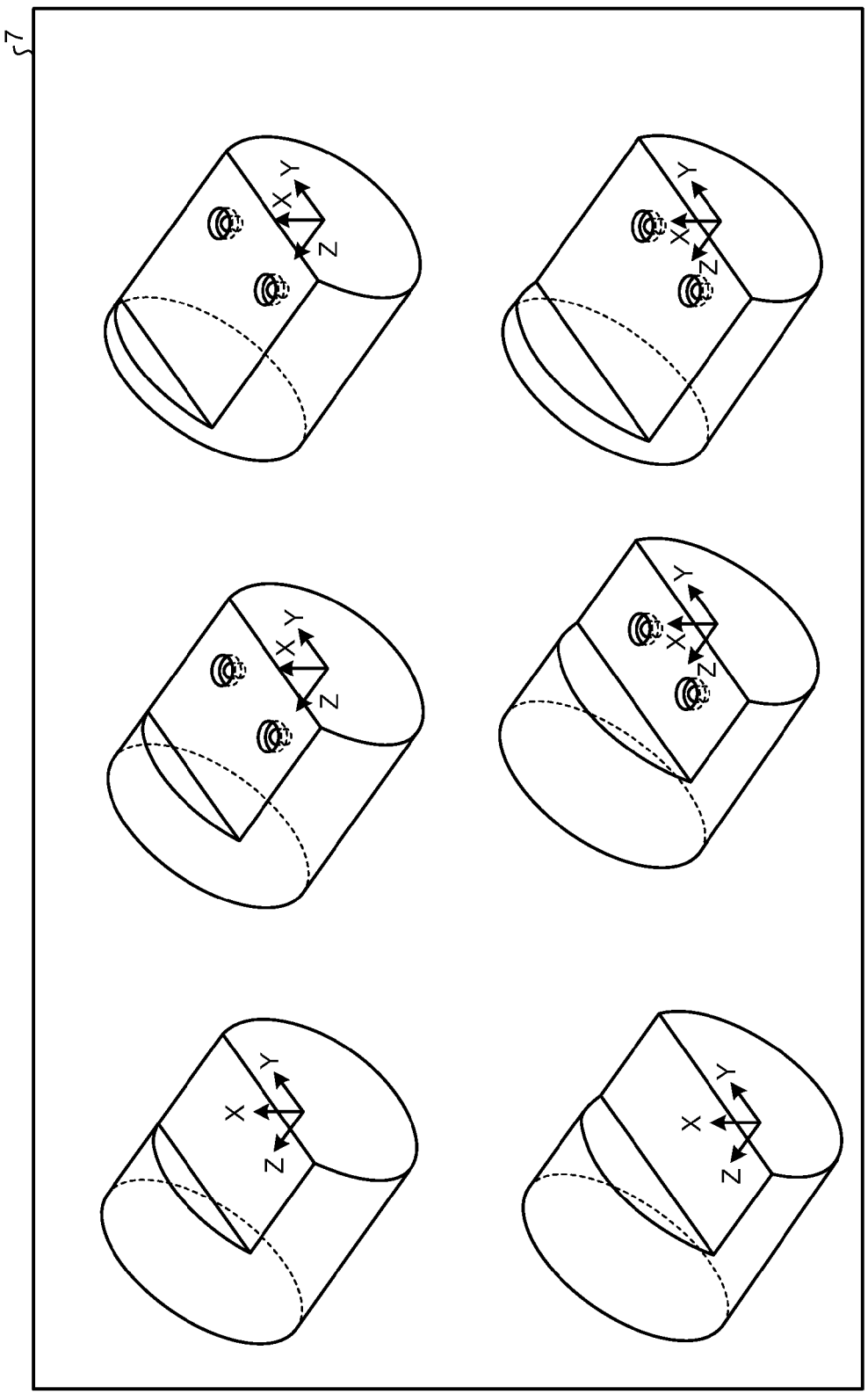
FIG. 24 is a diagram of a display example of an image list in which images are arranged in order from the image having the highest similarity based on shape data shown in FIG. 23.

After calculating the similarity, the NC-program searching section 3 sorts the images of the image data DB 14 in order from the image having the highest calculated similarity and displays the images as a list (step S502). FIG. 23 is a diagram of an example of a machining finish shape. FIG. 24 is a display example of an image list in which the images are arranged in order from the image having the highest similarity based on the shape data shown in FIG. 23.

The NC-program editing section 5 acquires, from the NC program DB 13, an NC program related to image data selected by the operator from a list of image data in which the image data are arranged in order from the image data having the highest similarity and displays the NC program on the display section 7 together with the image data.

The NC-program searching section 3 can store not only the similarity of the images but also maximum lengths in the radial direction and the Z-axis direction of machining finish shape of each of NC programs generated by the machining-finish-shape generating section 4, maximum length in each of the axial directions of the X axis, the Y axis, and the Z axis, or the like in the image data DB 14. In this case, the NC-program searching section 3 compares stored data and dimensional length of a product shape input to the CAD-data input section 1 and, for example, sorts the machining finish shapes in order from the machining finish shape having a smallest difference in the length in the radial direction and displays product shape data as a list. Consequently, for example, it is possible to narrow down the NC programs to the NC programs sorted according to the length in a direction designated by the operator.

The NC-program searching section 3 can sort the NC programs from the NC programs stored in the NC program DB 13 such that the NC programs match workpiece material, a specific machining type, a specific machining shape, a specific tool type/spare, or the like designated by the operator.

The machining-finish-shape generating section 4 generates image data of a finish shape in each machining process of an NC program. Each of machining processes in the NC program is specified using types of the machining processes, tools in use, and shape information for defining a shape (an area) to be machined.

The types of the machining processes include, for example, (1) lathe turning, (2) drilling, (3) line machining, and (4) area machining. Specifically, (1) the lathe turning includes (1-1) turning bar work, (1-2) turning drilling, and (1-3) turning threading. (2) The drilling includes (2-1)

drilling, (2-2) stepped drilling, and (2-3) tapping. (3) The line machining includes line machining for moving a tool along a designated shape. (4) The area machining includes (4-1) pocket milling for removing a designated shape and (4-2) surface machining.

The tools in use include a lathe turning tool, a drill, an end mill, a face mill, and a tap. In the shape information for defining a shape to be machined, a shape is defined using straight lines and arcs.

(1) In the lathe turning, a shape to be subjected to the lathe turning is defined on a +XY plane. The machining-finish-shape generating section 4 generates a removal shape of the lathe turning by rotating shape information of the lathe turning (a shape to be subjected to the lathe turning) 360 degrees around a lathe turning axis.

(2) In the drilling, a hole diameter, a hole depth, a hole bottom angle, and a chamfering amount of an edge of a hole are defined. The machining-finish-shape generating section 4 generates a simplex removal shape of the drilling from the hole diameter, the hole depth, the hole bottom angle, and the chamfering amount of the edge of the hole and generates a removal shape of the drilling by translating or rotating the simplex removal shape according to shape information in which a position where the drilling is performed is defined.

The machining-finish-shape generating section 4 generates a sweep shape formed by sweeping the tool shape in use according to shape information defined as the line machining to thereby generate a removal shape of the line machining.

When a workpiece outer diameter, a workpiece inner diameter, or a workpiece length is defined in the NC program, the machining-finish-shape generating section 4 generates a cylindrical shape, the diameter of which is the defined workpiece outer diameter and an axial direction of a cylinder of which is the defined workpiece length. The machining-finish-shape generating section 4 sets, as a workpiece shape, a shape formed by removing the cylindrical shape, the diameter of which is the workpiece inner diameter and the axial direction of the cylinder of which is the workpiece length.

When a workpiece is not defined in the NC program, the machining-finish-shape generating section 4 generates a rectangular parallelepiped including all the removal shapes generated in each of the machining processes of the NC program and sets the rectangular parallelepiped as a workpiece shape.

Figure 25:
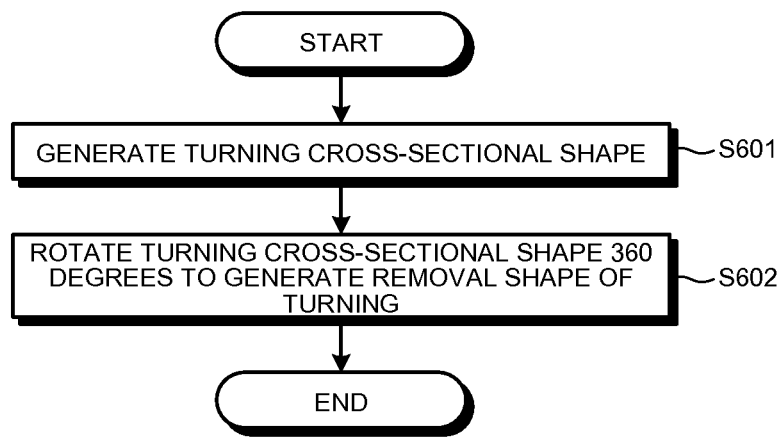
FIG. 25 is a flowchart for explaining a processing procedure for generating a machining shape of lathe turning.

The operation of the machining-finish-shape generating section 4 is explained. FIG. 25 is a flowchart for explaining a processing procedure for generating a machining shape of the lathe turning. The machining-finish-shape generating section 4 generates a lathe turning cross-sectional shape used when a shape to be subjected to the lathe turning is defined on the +XY plane and the lathe turning is performed from shape information of the lathe turning (step S601). The machining-finish-shape generating section 4 rotates the lathe turning cross-sectional shape 360 degrees around the Z axis, which is a lathe turning axis, and generates a removal shape of the lathe turning (step S602). The machining-finish-shape generating section 4 sets, as a removal shape of the lathe turning, an area extruded in the lathe turning cross-sectional shape by rotating the lathe turning cross-sectional shape 360 degrees around the Z axis.

Figure 26:
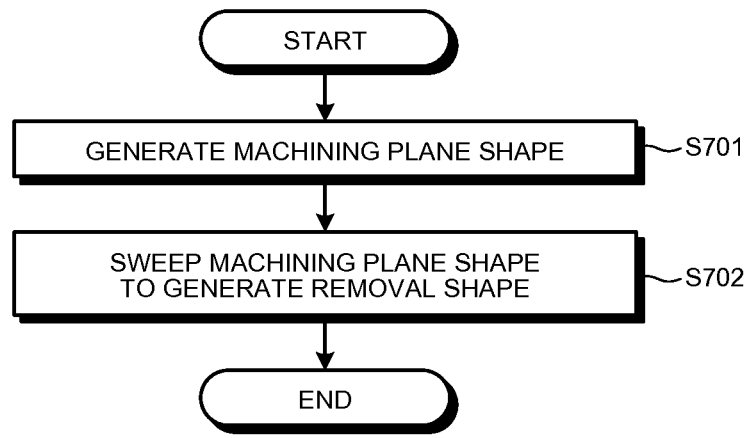
FIG. 26 is a flowchart for explaining a processing procedure for generating a machining shape of surface machining.

FIG. 26 is a flowchart for explaining a processing procedure for generating a machining shape of the surface machining. The machining-finish-shape generating section 4 sets shape information defined in the surface machining as a closed shape and generates a machining plane shape (step S701). The machining-finish-shape generating section 4 sets, as a sweep shape of the surface machining, a shape formed by sweeping the machining plane shape by a machining allowance along a normal vector of a machining plane (step S702). The machining-finish-shape generating section 4 sets, as a removal shape of the surface machining, an area extruded in the machining plane shape by sweeping the machining plane shape.

Figure 27:
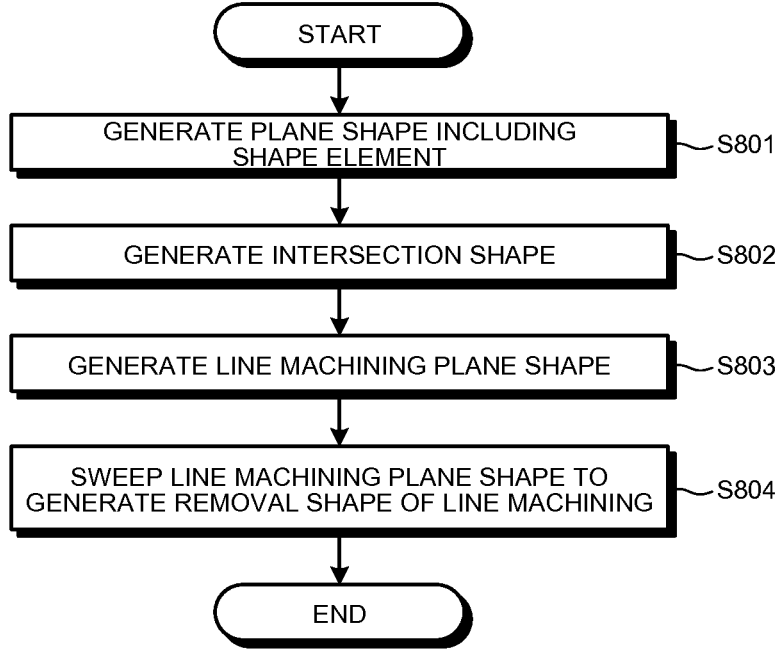
FIG. 27 is a flowchart for explaining a processing procedure for generating a machining shape of line machining.

FIG. 27 is a flowchart for explaining a processing procedure for generating a machining shape of the line machining. The machining-finish-shape generating section 4 generates, for each shape element defined in the line machining, a plane shape including the shape element. Specifically, the machining-finish-shape generating section 4 generates a rectangular plane when the shape element is a straight line and generates a sector form plane when the shape element is an arc (step S801). Width of each of shape elements is a machining allowance in the radial direction defined in the line machining. Subsequently, the machining-finish-shape generating section 4 generates, at an intersection of the shape elements, a circular shape (an intersection shape), the diameter of which is the machining allowance in the radial direction defined in the line machining (step S802). The machining-finish-shape generating section 4 adds up a plane shape including all shape elements generated at step S801 and all intersection shapes generated at step S802 to generate a line machining plane shape (step S803).

The machining-finish-shape generating section 4 sets, as a removal shape of the line machining, a shape formed by sweeping, in the normal vector direction of the plane, the line machining plane shape generated at step S803 by the length of the machining allowance in the axial direction defined in the line machining (step S804). The machining-finish-shape generating section 4 sets, as a removal shape of the line machining, a shape extruded by sweeping the line machining plane shape.

Figure 28:
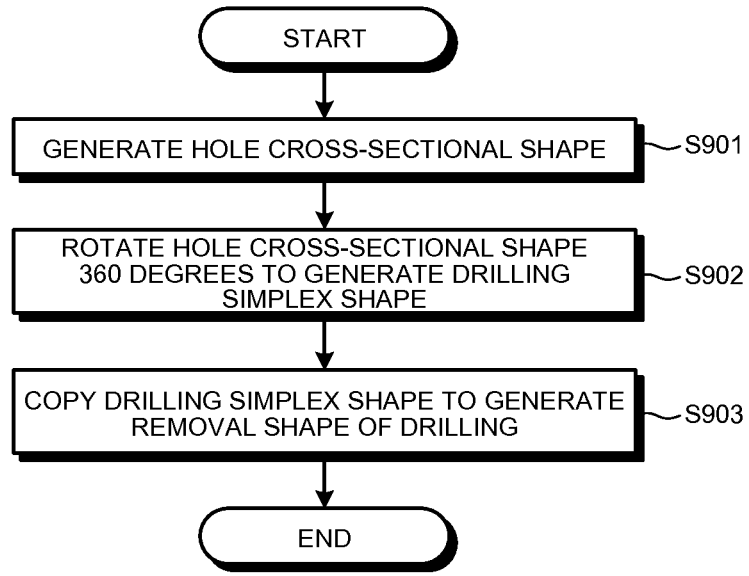
FIG. 28 is a flowchart for explaining a processing procedure for generating a machining shape of drilling.

FIG. 28 is a flowchart for explaining a processing procedure for generating a machining shape of the drilling. The machining-finish-shape generating section 4 generates a hole cross-sectionals shape on an XZ plane from hole depth, a hole distal end angle, hole chamfering, and a hole diameter defined in the drilling (step S901). The machining-finish-shape generating section 4 rotates the hole cross-sectional shape generated at step S901 360 degrees around the Z axis to generate a drilling simplex shape (step S902). An area extruded by rotating the hole cross-sectional shape 360 degrees around the Z axis is the drilling simplex shape.

Further, the machining-finish-shape generating section 4 copies the drilling simplex shape by the number of holes defined in the drilling, and translates or rotates the copied drilling simplex shapes respectively according to a machining position and a machining direction, and thereby forms a removal shape of the drilling (step S903).

In this way, the machining-finish-shape generating section 4 generates a removal shape, which is a shape to be removed from a workpiece, based on definition data concerning machining for each machining unit of the NC programs created in the past. Further, the machining-finish-shape generating section 4 generates a workpiece shape, which is a shape of the workpiece, based on the definition data.

The machining-finish-shape generating section 4 generates a machining finish shape by removing all the removal shapes generated in each of the machining processes of the NC program from the workpiece shape generated from the NC program.

When image data corresponding to the NC program stored in the NC program DB 13 is absent in the image data DB 14, the machining-finish-shape generating section 4 generates a machining finish shape from the NC program. The image-data generating section 2 generates the image data from the generated machining finish shape and stores the image data in the image data DB 14.

Figure 31:
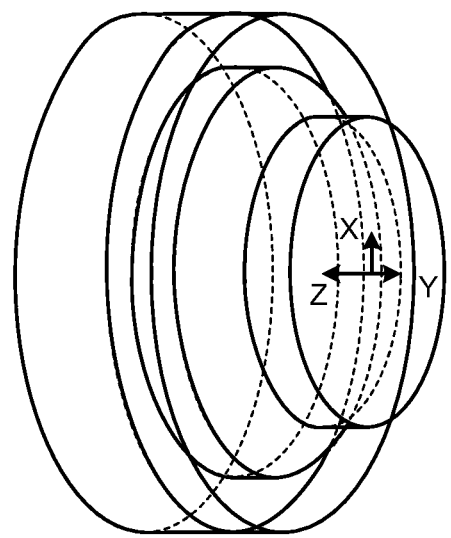
FIG. 31 is a diagram of an example of a machining finish shape formed by removing the removal shape of the lathe turning from a workpiece shape.

FIG. 29 is a diagram of an example of the lathe turning cross-sectional shape. FIG. 30 is a diagram of an example of the removal shape of the lathe turning. FIG. 31 is a diagram of an example of the machining finish shape formed by removing the removal shape of the lathe turning from the workpiece shape.

Figure 32:
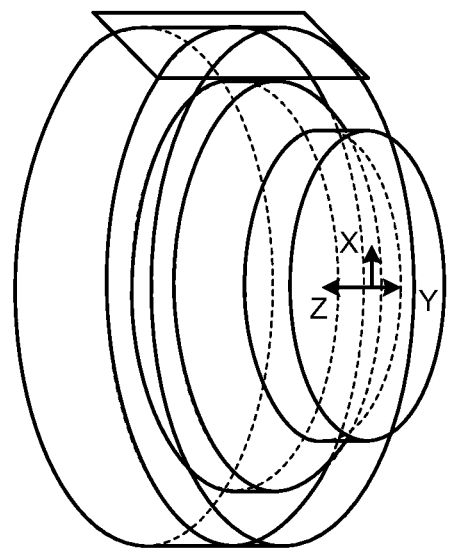
FIG. 32 is a diagram of an example of a machining plane shape of the surface machining.
Figure 33:
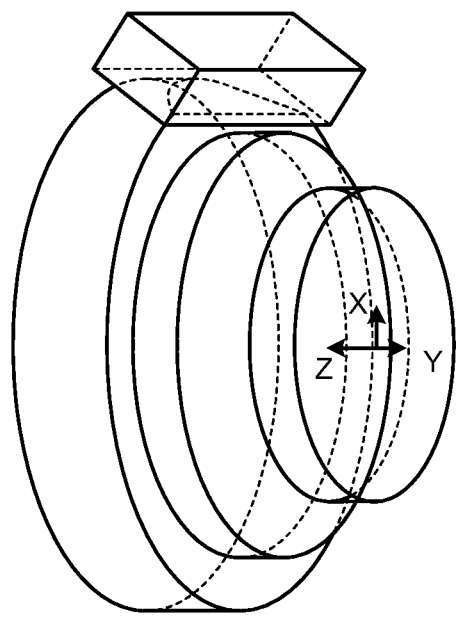
FIG. 33 is a diagram of an example of a removal shape of the surface machining.
Figure 34:
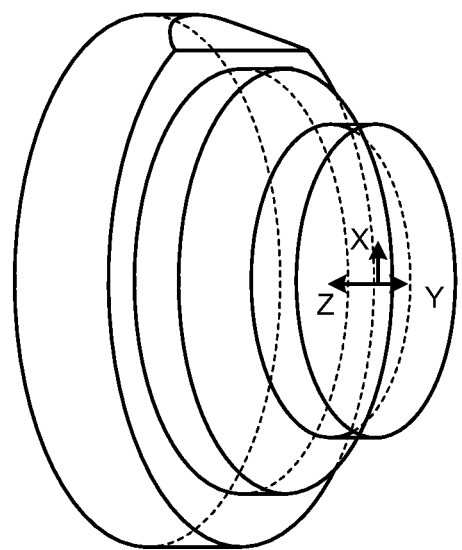
FIG. 34 is a diagram of an example of a machining finish shape formed by removing the removal shape of the surface machining shown in FIG. 33.

FIG. 32 is a diagram of an example of the machining plane shape of the surface machining. FIG. 33 is a diagram of an example of the removal shape of the surface machining. FIG. 34 is a diagram of an example of the machining finish shape formed by removing the removal shape of the surface machining shown in FIG. 33. In FIG. 34, there is shown an example of the machining finish shape after the removal of the removal shape of the lathe turning and the removal shape of the surface machining from the workpiece shape.

Figure 35:
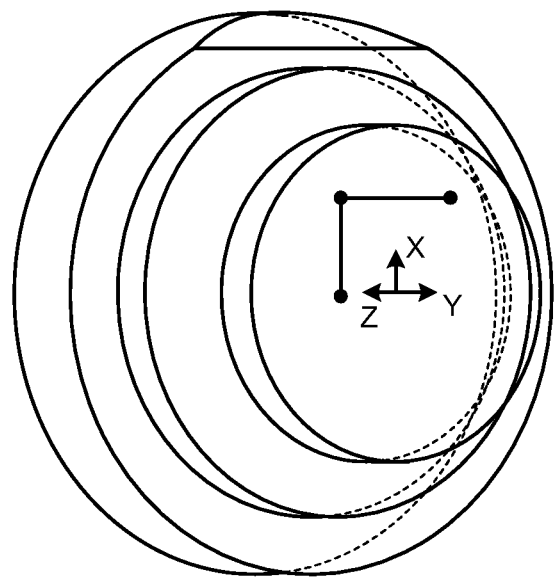
FIG. 35 is a diagram of an example of shape data of the line machining.
Figure 36:
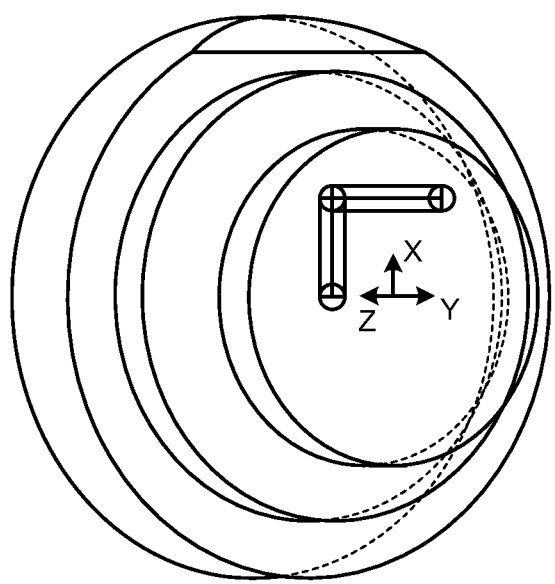
FIG. 36 is a diagram of an example of a plane shape including a shape element of the line machining.
Figure 37:
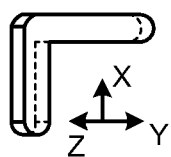
FIG. 37 is a diagram of an example of a removal shape of the line machining.
Figure 38:
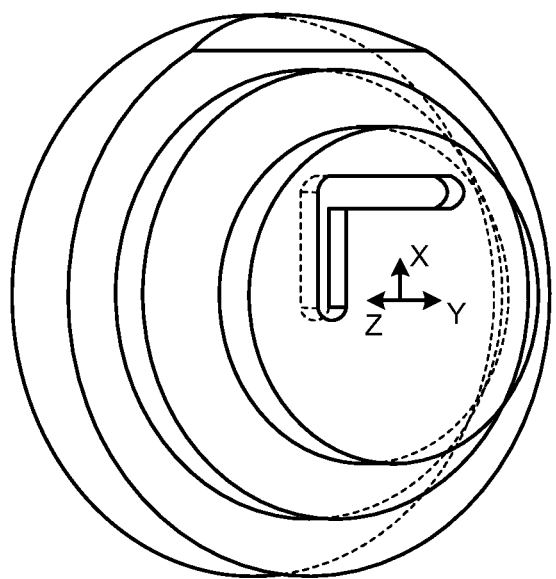
FIG. 38 is a diagram of an example of a machining finish shape formed by removing the removal shape of the line machining shown in FIG. 37.

FIG. 35 is a diagram of an example of the shape data of the line machining. FIG. 36 is a diagram of the plane shape including the shape element of the line machining. FIG. 37 is a diagram of an example of the removal shape of the line machining. FIG. 38 is a diagram of an example of the machining finish shape formed by removing the removal shape of the line machining shown in FIG. 37. In FIG. 38, there is shown an example of the machining finish shape after the removal of the removal shape of the lathe turning, the removal shape of the surface machining, and the removal shape of the line machining from the workpiece shape.

Figure 39:
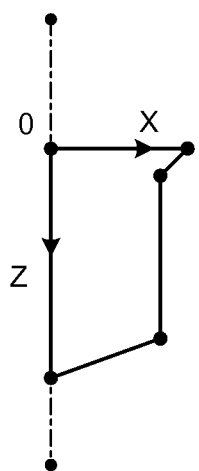
FIG. 39 is a diagram of an example of a hole cross-sectional shape.
Figure 40:
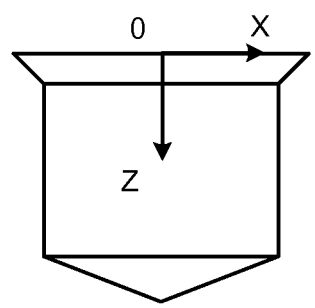
FIG. 40 is a diagram of an example of a drilling simplex shape.
Figure 41:
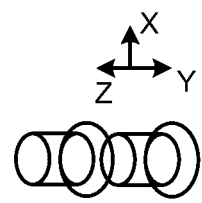
FIG. 41 is a diagram of an example of a removal shape of the drilling.
Figure 42:
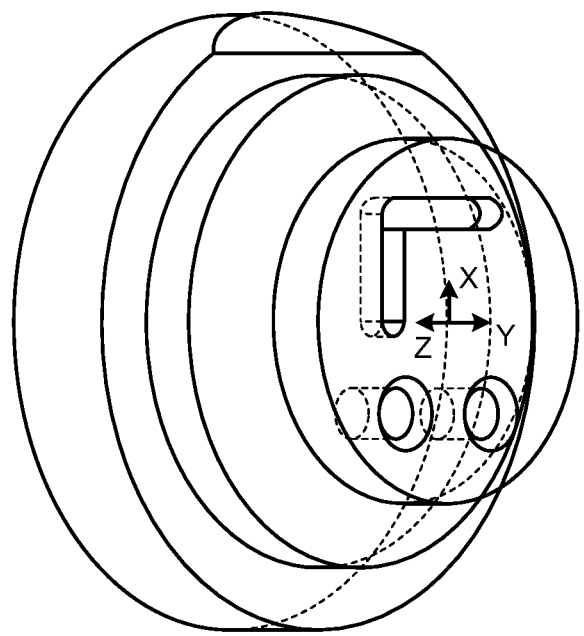
FIG. 42 is a diagram of an example of a machining finish shape formed by removing the removal shape of the drilling shown in FIG. 41.

FIG. 39 is a diagram of an example of the hole cross-sectional shape. FIG. 40 is a diagram of an example of the drilling simplex shape. FIG. 41 is a diagram of an example of the removal shape of the drilling. FIG. 42 is diagram of an example of the machining finish shape formed by removing the removal shape of the drilling shown in FIG. 41. In FIG. 42, there is shown an example of the machining finish shape after the removal of the removal shape of the lathe turning, the removal shape of the surface machining, the removal shape of the line machining, and the removal shape of the drilling from the workpiece shape.

Here, the operation of the NC-program editing section 5 is explained. The NC-program editing section 5 acquires, from the NC program DB 13, an NC program related to image data selected by the operator from the list of the image data arranged in order from the image data having the highest similarity and displays the NC program on the display section 7 together with the image data.

When the NC program displayed on the display section 7 is edited by the operator, the NC-program editing section 5 sends the NC program reflecting edited contents to the NC-program output section 9. Consequently, the NC-program output section 9 outputs the NC program sent from the NC-program editing section 5.

For example, the NC-program editing section 5 generates removal shape of each of machining processes in the NC program and causes the display section 7 to display the removal shapes together with a machining finish shape. When the removal shapes of the machining processes displayed on the display section 7 are selected by the operator, the NC-program editing section 5 can extract the machining processes on the NC program corresponding to the selected removal shapes and can insert the machining processes into another NC program together with the removal shapes. In other words, when a plurality of machining units are designated, by an external input, out of one or a plurality of finish shape image data, the NC-program editing section 5 can combine the designated machining units to generate an NC program.

Figure 43:
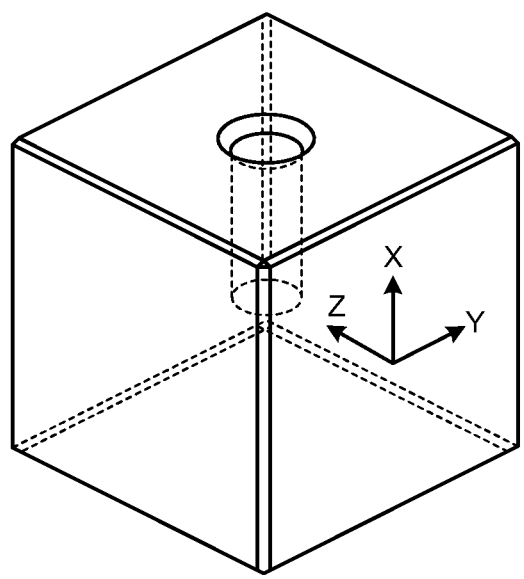
FIG. 43 is a diagram of an example of a machining finish shape of an NC program including drilling.
Figure 44:
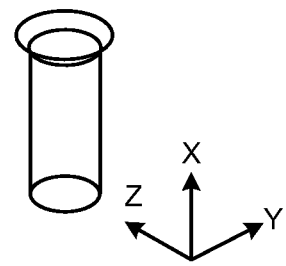
FIG. 44 is a diagram of a removal shape of the drilling.
Figures 45, 46:
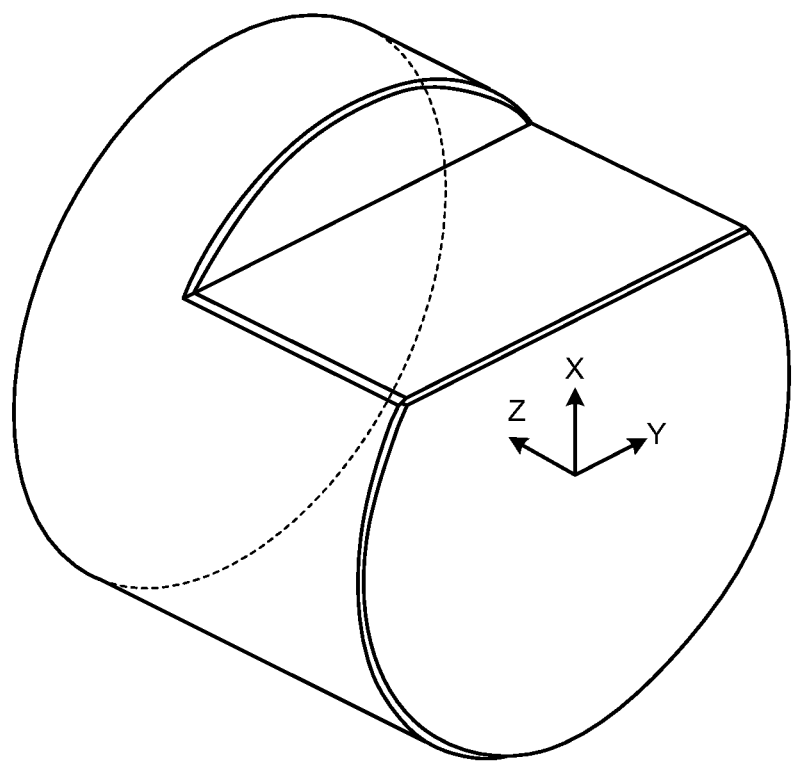
FIG. 45 is a diagram of an example of the NC program for the drilling.
FIG. 46 is a diagram of an example of a machining finish shape of an NC program not including the drilling.

FIG. 43 is a diagram of an example of a machining finish shape of an NC program including drilling. FIG. 44 is a diagram of a removal shape of the drilling. FIG. 45 is a diagram of an example of the NC program for the drilling.

Figures 47, 48:
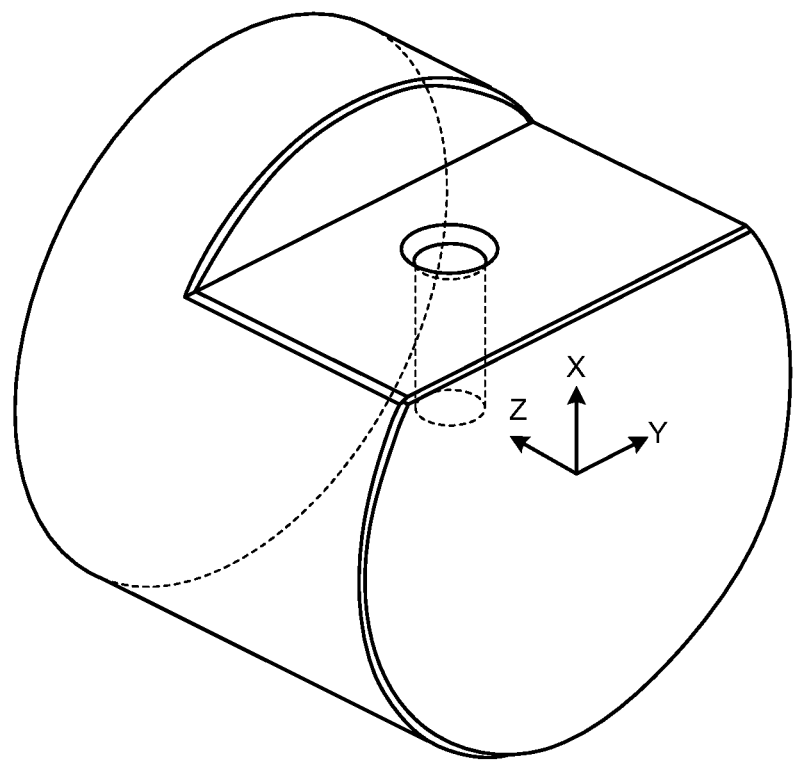
FIG. 47 is a diagram of an example of a machining finish shape formed after the removal shape and a machining program of the drilling are inserted into the machining finish shape.
FIG. 48 is a diagram of an example of an NC program for inserted drilling.

FIG. 46 is a diagram of an example of a machining finish shape of an NC program not including drilling. FIG. 47 is a diagram of an example of a machining finish shape formed after the removal shape and a machining program of the drilling are inserted into the machining finish shape. In FIG. 47, there is shown an example of the machining finish shape formed after the removal shape and the machining program of the drilling are extracted from the machining finish shape of the NC program including the drilling shown in FIG. 42 and inserted into the machining finish shape shown in FIG. 45. FIG. 48 is a diagram of an example of the NC program for the drilling inserted into the machining shape data shown in FIG. 47.

Figure 49:
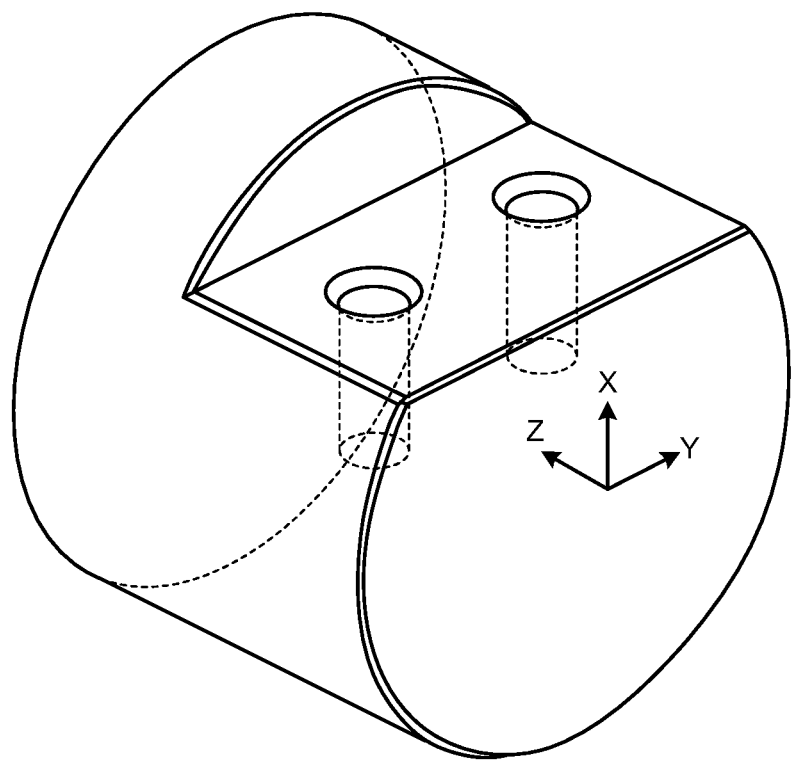
FIG. 49 is a diagram of an example of a machining finish shape formed by moving the inserted drilling and copying, reinserting, and moving the inserted drilling.
Figure 50:
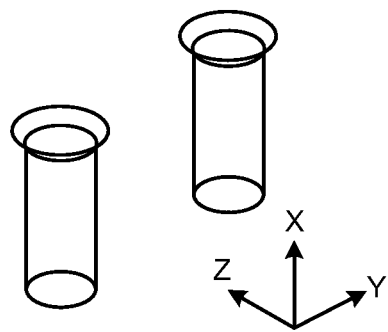
FIG. 50 is a diagram of an example of a removal shape configured by the inserted and moved drilling and the copied, inserted, and moved drilling.

FIG. 49 is a diagram of an example of a machining finish shape formed by moving the inserted drilling and further copying the inserted drilling and inserting and moving the inserted drilling again. FIG. 50 is a diagram of an example of a removal shape formed by the inserted and moved drilling and the copied, inserted, and moved drilling. FIG. 51 is a diagram of an example of an NC program formed by the inserted and moved drilling and the copied, inserted, and moved drilling.

In this way, when the shape data (the CAD data 21) of the product (the machining target) is input from the outside, the NC program creating unit 101 according to this embodiment generates image data (machining target image data) corresponding to the shape data of the product. The NC program creating unit 101 generates, based on NC programs created in the past, image data of a machining finish shape (finish shape image data) and stores in advance the image data in association with an NC program corresponding thereto. The NC program creating unit 101 compares the machining target image data and the finish shape image data, and thereby calculates similarity of both the image data. The NC program creating unit 101 searches, based on the similarity, candidates of the finish shape image data similar to or matching the machining target image data, and displays the candidates as a list. And, the NC program creating unit 101 displays, out of the candidates of the finish shape image data, an NC program of finish shape image data designated by an external input (the operator).

Therefore, it is possible to easily search image data similar to a workpiece to be machined. Further, it is possible to easily acquire an NC program corresponding to the image data (the CAD data 21).

As explained above, according to the embodiment, because similarities of image data are calculated and a list of the image data arranged in order from the image data having the highest similarity is generated, it is possible to easily and efficiently search an NC program for a machining finish shape similar to the CAD data 21. Therefore, it is possible to easily reuse the NC program and easily and efficiently create the NC program.

The finish shape image data is generated from the NC programs in the past. Therefore, it is possible to obtain finish shape image data with smaller computational complexity and in a shorter time than when a tool route simulation is performed.

Similarity is calculated by comparing the shape dimension of the original image and the shape dimension of the target image. Therefore, it is possible to analyze similarity of image data for shapes of similar figures as well.

Similarity is calculated based on a matching number and a matching rate between pixels rendered on the original image and pixels rendered on the target image. Therefore, it is possible to easily quantify similarity of image data.

Image data in one or a plurality of eye directions is set as an original image and one or a plurality of image data in the same eye direction are extracted as a target image out of the image data of the image data DB 14. Therefore, it is possible to improve accuracy of similarity of image data to be searchd. Further, machining units designated out of finish shape image data are combined to generate an NC program. Therefore, it is possible to easily perform reuse of the machining units.

INDUSTRIAL APPLICABILITY

As explained above, the NC-program searching method, the NC-program searching unit, the NC program creating method, and the NC program creating unit according to the present invention are suitable for search of an NC program for numerically controlling a machine tool.

REFERENCE SIGNS LIST

1 CAD-data input section
2 Image-data generating section
3 NC-program searching section
4 Machining-finish-shape generating section
5 NC-program editing section
6 Interactive-operation processing section
7 Display section
8 Instruction input section
9 NC-program output section
11 Image-data storing section
12 NC-program storing section
13 NC program DB
14 Image data DB
21 CAD data
31 NC program
50 Turning machining workpiece
51 Largest cylindrical surface
52, 61 Planes
53 Hole
60 Milling machining workpiece
101 NC program creating unit
102 Creation supporting device

The invention claimed is:

1. A numerical control (NC)-program searching method comprising:
generating, when shape data of a machining target is input from an outside, image data corresponding to the shape data of the machining target as machining target image data;
generating, based on NC programs created in the past, image data of a machining finish shape as finish shape image data;
storing the finish shape image data in association with an NC program corresponding thereto;
comparing the machining target image data and the finish shape image data to thereby calculate a similarity of the machining target image data to the finish shape image data;
searching, based on the similarity, candidates of finish shape image data similar to or matching the machining target image data and displaying the candidates;
displaying, out of the candidates of the finish shape image data, an NC program for finish shape image data designated by external input; and
outputting the NC program for finish shape image data designated by the external input to a machining tool so that the machining tool is operated based on the output NC program,
wherein the generating of the image data of the machining finish shape as the finish shape image data comprises:
generating a removal shape, which is a shape to be removed from the image data, based on the NC programs created in the past, and
generating the finish shape image data based on the removal shape.

2. The NC-program searching method according to claim 1, wherein the searching comprises displaying the candidates of the finish shape image data as a list in order from the candidate having the highest similarity.

3. The NC-program searching method according to claim 1, wherein the generating of the image data of the machining finish shape as finish shape image data comprises:
generating the removal shape, which is a shape to be removed from a workpiece, based on definition data concerning machining for each machining unit of the NC programs created in the past;
generating a workpiece shape, which is a shape of the workpiece, based on the definition data; and
generating the finish shape image data using the workpiece shape and the removal shape.

4. The NC-program searching method according to claim 1, wherein
the generating of the image data corresponding to the shape data of the machining target as machining target image data comprises calculating a first shape dimension, which is a shape dimension of the machining target, based on the shape data of the machining target or the machining target image data,
the generating of the image data of the machining finish shape as finish shape image data comprises calculating a second shape dimension, which is a shape dimension of the machining finish shape, based on the finish shape image data, and
the comparing comprises calculating the similarity by comparing a shape of the machining target and the machining finish shape based on the first shape dimension and the second shape dimension.

5. The NC-program searching method according to claim 1, further comprising extracting, when at least one of material of a workpiece, a machining type, a tool type, and a cutter diameter is designated by the external input as narrowing-down information concerning an NC program used in machining the machining target, an NC program corresponding to the narrowing-down information out of the NC programs created in the past, and
the comparing comprises extracting finish shape image data corresponding to the extracted NC program and calculating the similarity by comparing the extracted finish shape image data and the machining target image data.

6. The NC program searching method according to claim 1, wherein the comparing comprises calculating the similarity based on a matching degree between a pixel of the machining target image data and a pixel of the finish shape image data.

7. The NC-program searching method according to claim 1, wherein the comparing comprises calculating the similarity based on a matching degree between an edge or an edge end point of the machining target image data and an edge or an edge point of the finish shape image data.

8. The NC-program searching method according to claim 1, wherein the generating of the image data of the machining finish shape as finish shape image data comprises generating the finish shape image data from a plurality of eye directions.

9. The NC-program searching method according to claim 1, further comprising:
combining, when a plurality of machining units are designated by the external input out of one or a plurality of finish shape image data, the designated machining units to generate an NC program; and
displaying the generated NC program.

10. The NC-program searching method according to claim 1, further comprising editing, according to an instruction input from the outside, an NC program being displayed.

11. A numerical control (NC)-program searching unit comprising:
an inputter to which shape data of a machining target is input from an outside;
an image-data generator configured to generate, as machining target image data, image data corresponding to the shape data of the machining target;
an NC-program storage configured to store NC programs created in the past;
a finish-shape generator configured to generate, based on the NC programs created in the past, image data of a machining finish shape as finish shape image data;
an image-data storage configured to store the finish shape image data in association with an NC program corresponding thereto;
a searcher configured to compare the machining target image data and the finish shape image data to thereby calculate a similarity of the machining target image data to the finish shape image data and search, based on the similarity, candidates of finish shape image data similar to or matching the machining target image data;
a display configured to display the candidates of the finish shape image data and display, when finish shape image data is designated by external input out of the candidates of the finish shape image data, an NC program corresponding to the designated finish shape image data; and
an NC-program outputter comprising a processor configured to output the NC program corresponding to the designated finish shape image data to a machining tool so that the machining tool is operated based on the output NC program,
wherein the finish-shape generator is configured to generate a removal shape, which is a shape to be removed from the image data, based on the NC programs created in the past, and generate the finish shape image data based on the removal shape.

12. A numerical control (NC) program creating unit comprising:
an inputter to which shape data of a machining target is input from an outside;
an image-data generator configured to generate, as machining target image data, image data corresponding to the shape data of the machining target;
an NC-program storage configured to store NC programs created in the past;
a finish-shape generator configured to generate, based on the NC programs created in the past, image data of a machining finish shape as finish shape image data;
an image-data storage configured to store the finish shape image data in association with an NC program corresponding thereto;
a searcher configured to compare the machining target image data and the finish shape image data to thereby calculate a similarity of the machining target image data to the finish shape image data and search, based on the similarity, candidates of finish shape image data similar to or matching the machining target image data;
a display configured to display the candidates of the finish shape image data and display, when finish shape image data is designated by external input out of the candidates of the finish shape image data, an NC program corresponding to the designated finish shape image data;
an editor configured to edit, according to an instruction input from the outside, an NC program being displayed; and
an NC-program outputter comprising a processor configured to output the NC program corresponding to the designated finish shape image data to a machining tool so that the machining tool is operated based on the output NC program,
wherein the finish-shape generator is configured to generate a removal shape, which is a shape to be removed from the image data, based on the NC programs created in the past, and generate the finish shape image data based on the removal shape.

* * * * *